(12) United States Patent
Jang et al.

(10) Patent No.: US 9,197,389 B2
(45) Date of Patent: Nov. 24, 2015

(54) METHOD AND APPARATUS FOR TRANSMITTING CHANNEL QUALITY CONTROL INFORMATION IN WIRELESS ACCESS SYSTEM

(71) Applicant: LG Electronics Inc., Seoul (KR)

(72) Inventors: Jiwoong Jang, Anyang-si (KR);
Jaehoon Chung, Anyang-si (KR);
Minseok Noh, Anyang-si (KR);
Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/221,063

(22) Filed: Mar. 20, 2014

(65) Prior Publication Data

US 2014/0204878 A1    Jul. 24, 2014

Related U.S. Application Data

(63) Continuation of application No. 13/396,406, filed on Feb. 14, 2012, now Pat. No. 8,737,277.

(60) Provisional application No. 61/443,207, filed on Feb. 15, 2011.

(30) Foreign Application Priority Data

Jan. 5, 2012 (KR) ................ 10-2012-0001527

(51) Int. Cl.
*H04B 7/216*    (2006.01)
*H04L 5/00*     (2006.01)
(Continued)

(52) U.S. Cl.
CPC ............ *H04L 5/0055* (2013.01); *H04L 1/0042* (2013.01); *H04L 1/0067* (2013.01);
(Continued)

(58) Field of Classification Search
CPC ... H04L 1/0042; H04L 1/0067; H04L 1/0073; H04L 1/1861; H04L 5/0055; H04L 1/0031; H04L 5/0023; H04L 5/0044; H04L 5/0048; H04L 5/0053
USPC ......... 370/280, 281, 295, 311, 329, 330, 335, 370/341, 349, 464; 375/141, 219, 253, 295, 375/316; 455/450, 452.1, 509, 522
See application file for complete search history.

(56) References Cited

U.S. PATENT DOCUMENTS

2009/0204863 A1*   8/2009   Kim et al. ................. 714/748
2011/0035639 A1    2/2011   Earnshaw et al.
(Continued)

OTHER PUBLICATIONS

Panasonic, 3GPP TSG RAN WG1 Meeting #61bls, Jun. 28, 2010 (From Applicant's IDS filed on Mar. 20, 2014.).*
(Continued)

*Primary Examiner* — Mang Yeung
(74) *Attorney, Agent, or Firm* — Birch, Stewart, Kolasch & Birch, LLP

(57) ABSTRACT

Methods and devices for transmitting or receiving channel quality control information through a physical uplink shared channel (PUSCH) in a wireless access system that supports hybrid automatic retransmit request (HARQ) are discussed. The method in one embodiment performed by a user equipment (UE) includes receiving a physical downlink control channel (PDCCH) signal including an initial uplink grant, transmitting uplink data using two transport blocks based on the initial uplink grant, receiving a negative acknowledgement (NACK) information for one of the two transport blocks, and transmitting a channel quality control information along with the one of the two transport blocks which is retransmitted according to the NACK information or a new transport block through the PUSCH to which the HARQ is applied. A number of coded symbols required to transmit the channel quality control information (Q') is calculated based on the initial uplink grant.

10 Claims, 20 Drawing Sheets

(51) Int. Cl.
  *H04L 1/18* (2006.01)
  *H04L 1/00* (2006.01)
(52) U.S. Cl.
  CPC ............ *H04L1/0073* (2013.01); *H04L 1/1861*
  (2013.01); *H04L 1/0031* (2013.01); *H04L*
  *5/0023* (2013.01); *H04L 5/0044* (2013.01);
  *H04L 5/0048* (2013.01); *H04L 5/0053*
  (2013.01)

(56) References Cited

U.S. PATENT DOCUMENTS

| | | | |
|---|---|---|---|
| 2012/0044883 A1 | 2/2012 | Jang et al. | |
| 2012/0044884 A1 | 2/2012 | Jang et al. | |
| 2012/0044885 A1 | 2/2012 | Jang et al. | |
| 2012/0044886 A1 | 2/2012 | Jang et al. | |
| 2012/0182944 A1* | 7/2012 | Sorrentino et al. | 370/329 |

OTHER PUBLICATIONS

3GPP TS 36.212 V9.3.0 (Sep. 2010) (From Applicant's IDS filed on Mar. 20, 2014.).*
3GPP, "Technical Specification Group Radui Access Network; Evolved Universal Terrestrial Radio Access (E-UTRA); Multiplexing and channel coding (Release 9)", 3GPP TS 36.212 V9.3.0, Sep. 2010, pp. 1-61.
Panasonic, "UCI Multiplexing on PUSCH with MIMO Transmission," 3GPP TSG RAN WG1 Meeting #61bis, R1-103770, Dresden, Germany, Jun. 28-Jul. 2, 2010, pp. 1-4.
Qualcomm Incorporated, "UCI Transmission for CA," 3GPP TSG RAN WG1 #62bis, R1-105563, Oct. 11-15, 2012, Xian, China, pp. 1-3.
Samsung, "PUSCH Selection for UCI Multiplexing with UL CA," 3GPP TSG RAN WG1 #63, R1-106024, Jacksonville, Florida, USA, Nov. 15-19, 2010, pp. 1-3.

* cited by examiner (a)

(b)

(a)

(b)

METHOD AND APPARATUS FOR TRANSMITTING CHANNEL QUALITY CONTROL INFORMATION IN WIRELESS ACCESS SYSTEM

CROSS-REFERENCE TO RELATED APPLICATIONS

This application is a continuation of copending U.S. patent application Ser. No. 13/396,406, filed on Feb. 14, 2012, which claims priority to Korean Patent Application No. 10-2012-0001527, filed on Jan. 5, 2012 and to U.S. Provisional Application Ser. No. 61/443,207, filed on Feb. 15, 2011. The contents of all of these applications are hereby incorporated by reference as fully set forth herein in their entirety.

FIELD OF INVENTION

The present invention relates to a wireless access system, and more particularly, to a method and apparatus for transmitting uplink channel information (UCI) including channel quality control information in a carrier aggregation environment (i.e., a multi-component carrier environment). The invention relates to a method and apparatus for obtaining the number of resource elements allocated to UCI when the UCI piggybacks on a physical uplink shared channel (PUSCH).

DISCUSSION OF THE RELATED ART

A 3GPP LTE (3rd Generation Partnership Project Long Term Evolution; Rel-8 or Rel-9) system (hereinafter referred to as an LTE system) employs multi-carrier modulation (MCM) that splits a single component carrier (CC) into multiple bands and uses the multiple bands. However, a 3PP LTE-Advanced system (hereinafter referred to as an LTE-A system) can use carrier aggregation (CA) that aggregates one or more CCs to support a system bandwidth wider than that of the LTE system. The CA can be replaced by carrier matching, multi-CC environment, or multi-carrier environment.

In a single CC environment such as an LTE system, a description is made of only a case in which uplink control information (UCI) and data are multiplexed using a plurality of layers on one CC.

In a CA environment, however, one or more CCs can be used and the number of pieces of UCI can be increased to a multiple of the number of CCs. For example, while rank indication information has 2 or 3 bits in the LTE system, it can have a maximum of 15 bits in the LTE-A system since the bandwidth can be extended to up to 5 CCs.

In this case, UCI having a size of 15 bits cannot be transmitted using a UCI transmission method defined in the LTE system and cannot be encoded even when Reed-Muller (RM) code is used. Accordingly, the LTE-A system needs a new method for transmitting UCI having a large size.

SUMMARY OF THE INVENTION

Accordingly, the present invention is directed to methods and apparatuses for transmitting channel quality control information, which substantially obviates one or more of the problems due to limitations and disadvantages of the related art.

An object of the present invention is to provide a method for efficiently encoding and transmitting UCI in a multi-carrier environment (or CA environment).

Another object of the present invention is to provide a method for obtaining the number of resource elements (REs) allocated to UCI when the UCI piggybacks on a PUSCH.

Another object of the present invention is to provide a method for calculating the number of REs required to transmit channel quality control information (i.e., CQI and/or PMI) when UCI is retransmitted using two or more transport blocks (TBs).

Another object of the present invention is to provide a user equipment (UE) and/or a base station apparatus for supporting the above-described methods.

Technical problems to be solved by the present invention are not limited to the above-mentioned technical problem, and other technical problems not mentioned above can be clearly understood by one skilled in the art from the following description.

To achieve these and other advantages and in accordance with the purpose of the present invention, as embodied and broadly described, the embodiments of the present invention disclose methods and apparatuses for transmitting UCI including channel quality control information in a CA environment.

In one aspect of the present invention, a method for transmitting channel quality control information using two transport blocks in a wireless access system that supports hybrid automatic retransmit request (HARQ) includes the steps of receiving a physical downlink control channel (PDCCH) signal including downlink control information (DCI), calculating the number of coded symbols, Q', required to transmit the channel quality control information using the DCI, and transmitting the channel quality control information through a physical uplink shared channel (PUSCH) on the basis of the number of coded symbols.

In another aspect of the present invention, a UE for transmitting channel quality control information using two transport blocks in a wireless access system that supports HARQ includes a transmission module for transmitting a radio signal, a reception module for receiving a radio signal, and a processor configured to support transmission of the channel quality control information. The UE may receive a PDCCH signal including DCI, calculate the number of coded symbols, Q', required to transmit channel quality control information using the DCI, and transmit the channel quality control information over a PUSCH on the basis of the number of coded symbols.

The number of coded symbols, Q', may be calculated using $$\min\left(\left\lceil\frac{(O+L)\cdot M_{sc}^{PUSCH-initial(x)}\cdot N_{symb}^{PUSCH-initial(x)}\cdot \beta_{offset}^{PUSCH}}{\sum_{r=0}^{C^{(x)}-1} K_r^{(x)}}\right\rceil,\right.$$

$$\left. M_{sc}^{PUSCH}\cdot N_{symb}^{PUSCH}-\frac{Q_{RI}^{(x)}}{Q_m^{(x)}}\right)$$

and the DCI may include information $M_{sc}^{PUSCH-initial(x)}$ on the number of subcarriers for a first transport block for transmitting the channel quality control information, information $C^{(x)}$ on the number of code blocks related to the first transport block, and information $K_r^{(x)}$ on the size of the code blocks, wherein x denotes an index of one of the two transport blocks.

The first transport block may be a transport block having a higher modulation and coding scheme (MCS) level from the two transport blocks. If the two transport blocks have the same MCS level, the first transport block may be the first one of the two transport block.

In the step of the transmitting of the channel quality control information, the UE is able to piggyback the channel quality control information on uplink data retransmitted using HARQ and transmit the uplink data with the channel quality control information.

The UE may compute information about the uplink data using $G=N_L^{(x)} \cdot (N_{symb}^{PUSCH} \cdot M_{sc}^{PUSCH} \cdot Q_m^{(x)} - Q_{CQI} - Q_{RI}^{(x)})$.

In another aspect of the present invention, a method for receiving channel quality control information using two transport blocks in a wireless access system that supports HARQ includes enabling an eNB to transmit a PDCCH signal including DCI to a UE, and receiving the channel quality control information through a PUSCH from the UE.

The number of coded symbols, Q', required to transmit the channel quality control information, may be calculated using $$\min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right),$$

and the DCI may include information $M_{sc}^{PUSCH-initial(x)}$ on the number of subcarriers for a first transport block for transmitting the channel quality control information, information $C^{(x)}$ on the number of code blocks related to the first transport block, and information $K_r^{(x)}$ on the size of the code blocks, wherein x denotes an index of one of the two transport blocks.

In another aspect of the present invention, the first transport block may be a transport block having a higher MCS level from the two transport blocks. If the two transport blocks have the same MCS level, the first transport block may be the first one of the two transport blocks.

The channel quality control information may piggyback on uplink data retransmitted using HARQ to be received. Information about the uplink data may be calculated by $G=N_L^{(x)} \cdot (N_{symb}^{PUSCH} \cdot M_{sc}^{PUSCH} \cdot Q_m^{(x)} - Q_{CQI} - Q_{RI}^{(x)})$.

The above embodiments are part of preferred embodiments of the present invention. Obviously, it is to be understood to those having ordinary knowledge in the art that various embodiments having the technical features of the present invention can be implemented on the detailed description of the present invention as set forth herein.

According to exemplary embodiments of the present invention, the following advantages can be obtained.

UCI can be efficiently encoded and transmitted in a multi-carrier environment (or CA environment).

Furthermore, the number of REs required to transmit CQI and/or PMI can be correctly calculated for each TB when UCI is transmitted using two or more TBs.

Moreover, when channel quality control information (CQI/PMI) piggybacks on a PUSCH, the number of REs required to transmit the CQI/PMI can be exactly calculated for each TB. Particularly, when initial resource values of two TBs are different from each other due to HARQ retransmission, the number of REs required to transmit CQI/PMI through a PUSCH can be correctly calculated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Figure 1:
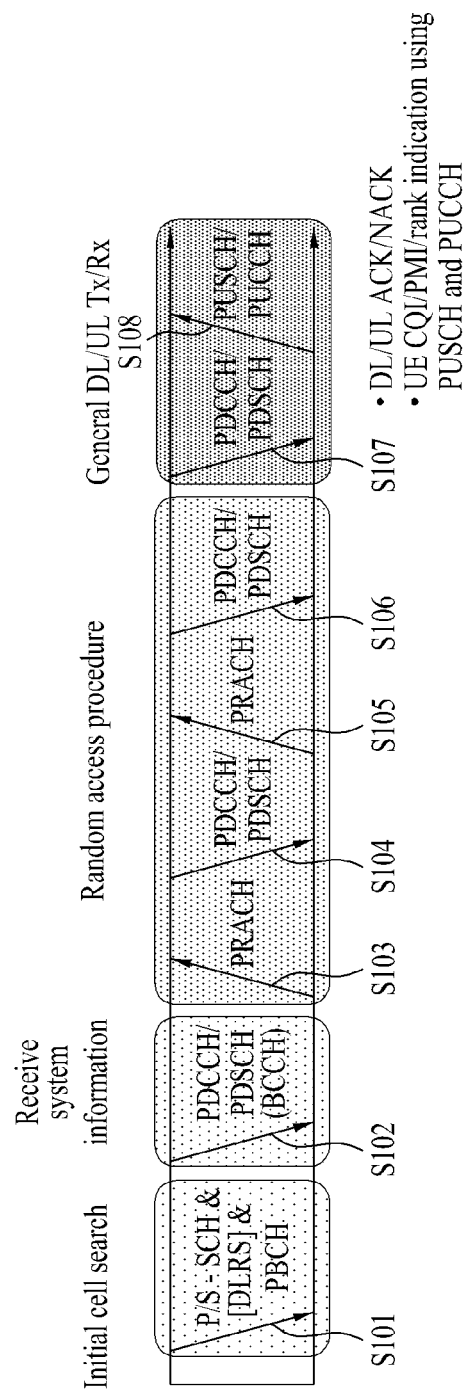
FIG. 1 is a view referred to for describing physical channels used in a 3GPP LTE system and a general signal transmission method using the physical channels.

Exemplary embodiments of the present invention provide a method and apparatuses for transmitting and receiving UCI in a CA environment (or multi-component carrier environment). In addition, exemplary embodiments of the present invention provide methods and apparatuses for transmitting and receiving RI information, and methods and apparatuses for applying an error detection code to UCI.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 36.211, 3GPP TS 36.212, 3GPP TS 36.213, and 3GPP TS 36.321 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems. However, this is merely exemplary and the present invention can be applied to IEEE 802.16e/m systems.

1. 3GPP LTE/LTE-A System

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

FIG. 1 is a view referred to for describing physical channels used in a 3GPP LTE system and a signal transmission method using the same.

When a UE is powered on or newly enters a cell, the UE performs an initial cell search operation including synchronization with a BS in S101. To implement this, the UE receives a primary synchronization channel (P-SCH) and a secondary synchronization channel (S-SCH) to synchronize with the BS and acquires information such as cell ID.

Then, the UE can acquire broadcast information in the cell by receiving a physical broadcast channel (PBCH) signal from the BS. The UE can receive a downlink reference signal (DL RS) in the initial cell search operation to check a downlink channel state.

Upon completion of the initial cell search, the UE receives a physical downlink control channel (PDCCH) and a physical downlink shared channel (PDSCH) according to PDCCH information to acquire more detailed system information in S102.

Subsequently, the UE can perform a random access procedure, S103 to S106, in order to complete access to the BS. To achieve this, the UE transmits a preamble through a physical random access channel (PRACH) (S103) and receives a response message to the preamble through a PDCCH and a PDSCH corresponding to the PDCCH (S104). In the case of contention-based random access, the UE can perform a contention resolution procedure of transmitting an additional PRACH signal (S105) and receiving a PDCCH signal and a PDSCH signal corresponding to the PDCCH signal (S106).

Upon completion of the random access procedure, the UE can perform a general uplink/downlink signal transmission procedure of receiving a PDCCH signal and/or a PDSCH signal (S107) and transmitting a physical uplink shared channel (PUSCH) and/or a physical uplink control channel (PUCCH) (S108).

Control information transmitted from a UE to a BS is referred to as uplink control information (UCI). UCI includes HARQ-ACK/NACK (Hybrid Automatic Repeat and request Acknowledgement/Negative-ACK), SR (Scheduling Request), CQI (Channel Quality Indication), PMI (Precoding Matrix Indicator), RI (Rank Information), etc.

In the LTE system, UCI is periodically transmitted through a PUCCH, in general. However, UCI can be transmitted through a PUSCH when control information and traffic data need to be simultaneously transmitted. In addition, UCI can be non-periodically transmitted through a PUSCH at the request/instruction of a network.

Figure 2:
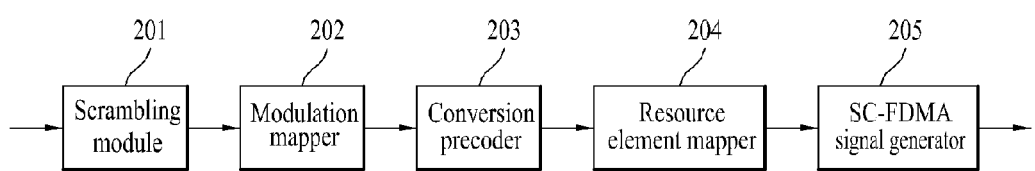
FIG. 2 illustrates a configuration of a user equipment (UE) and a signal processing procedure for transmitting an uplink signal.

FIG. 2 is a view referred to for describing a configuration of a UE and a signal processing procedure of the UE to transmit an uplink signal.

To transmit an uplink signal, a scrambling module 210 of the UE can scramble a transmitted signal using a UE-specific scramble signal. The scrambled signal is input to a modulation mapper 202 and modulated into a complex symbol using BPSK (Binary Phase Shift Keying), QPSK (Quadrature Phase Shift Keying), or 16QAM/64QAM (Quadrature Amplitude Modulation). The complex symbol is processed by a conversion precoder 203 and applied to a resource element mapper 204. The resource element mapper 204 can map the complex symbol to a time-frequency resource element. The signal processed in this manner can be transmitted to the BS through an antenna via an SC-FDMA signal generator 205.

Figure 3:
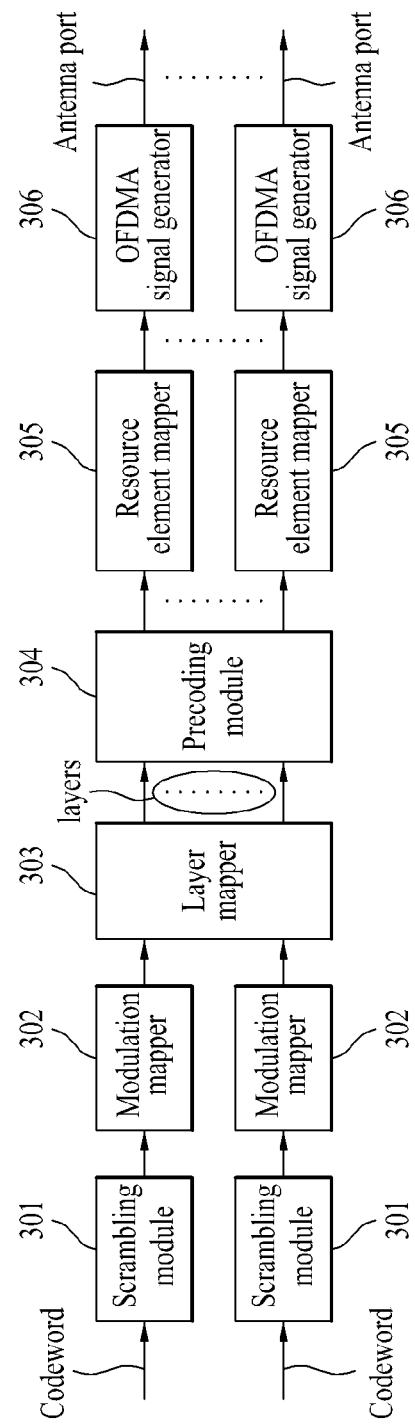
FIG. 3 illustrates a configuration of a base station (BS) and a signal processing procedure for transmitting a downlink signal.

FIG. 3 is a view referred to for describing a configuration of a BS and a signal processing procedure of the BS to transmit a downlink signal.

In a 3GPP LTE system, the BS can transmit one or more codewords through a downlink. Each codeword can be processed into a complex symbol through a scrambling module 301 and a modulation mapper 302 as in the uplink shown in FIG. 2. The complex symbol is mapped by a layer mapper 303 to a plurality of layers each of which can be multiplied by a precoding matrix by a precoding module 304 to be allocated to each transmit antenna. A transmission signal for each antenna, processed as above, is mapped by a resource element mapper 305 to a time-frequency resource element. The mapped signal is subjected to an OFDM signal generator 306 and transmitted through each antenna.

When a UE transmits a signal on uplink in a radio communication system, PAPR (Peak-to-Average Ratio) becomes a problem, compared to a case in which a BS transmits a signal on downlink. Accordingly, SC-FDMA is used for uplink signal transmission, as described above with reference to FIGS. 2 and 3, while OFDMA is used for downlink signal transmission.

Figure 4:
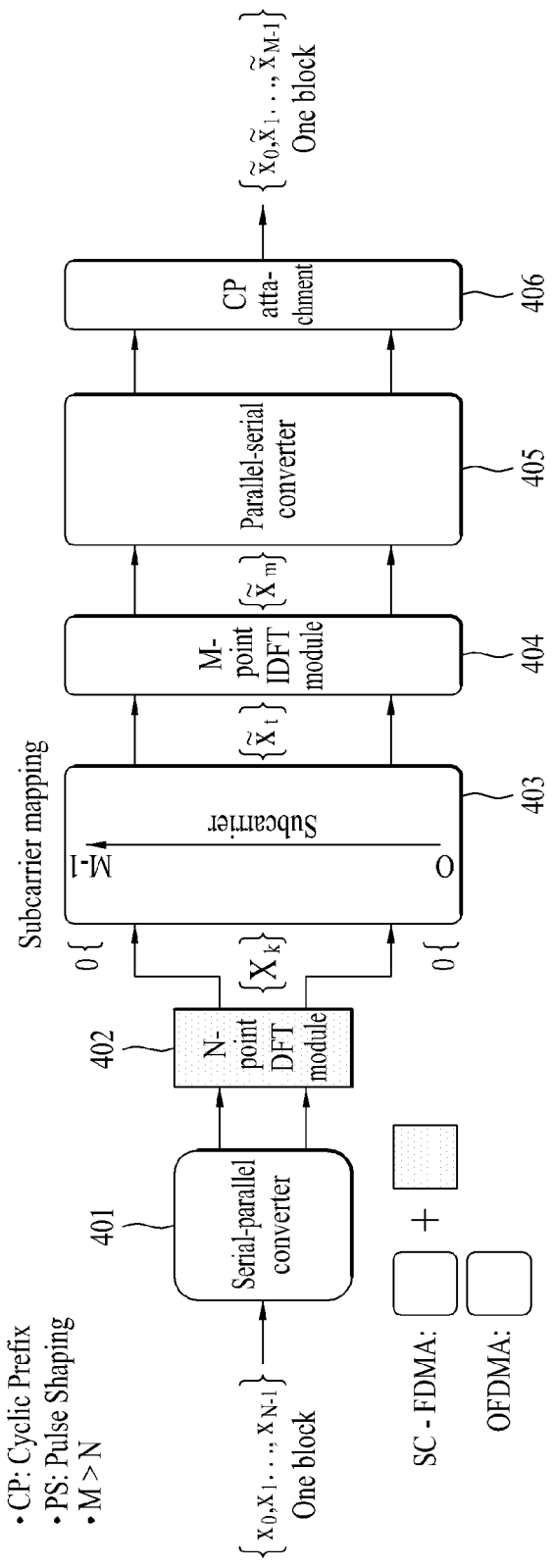
FIG. 4 is a view referred to for describing a configuration of a UE and SC-FDMA and OFDMA schemes.

FIG. 4 is a view referred to for describing a configuration of a UE and SC-FDMA and OFDMA.

A 3GPP system (e.g. LTE system) employs OFDMA on downlink and uses SC-FDMA on uplink. Referring to FIG. 4, both a UE for uplink signal transmission and a BS for downlink signal transmission include a serial-to-parallel converter 401, a subcarrier mapper 403, an M-point IDFT module 404, and a cyclic prefix (CP) addition module 406.

The UE for transmitting a signal through SC-FDMA additionally includes an N-point DFT module 402. The N-point DFT module 402 offsets the influence of IDFT of the M-point IDFT module 404 on a transmission signal such that the transmission signal has single carrier properties.

Figure 5:
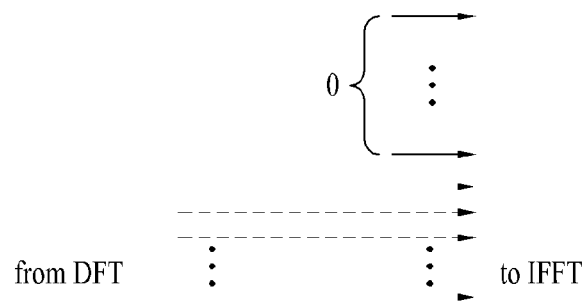
FIG. 5 is a view referred to for describing a signal mapping method in a frequency domain to satisfy single carrier properties in the frequency domain.
Figure 5:
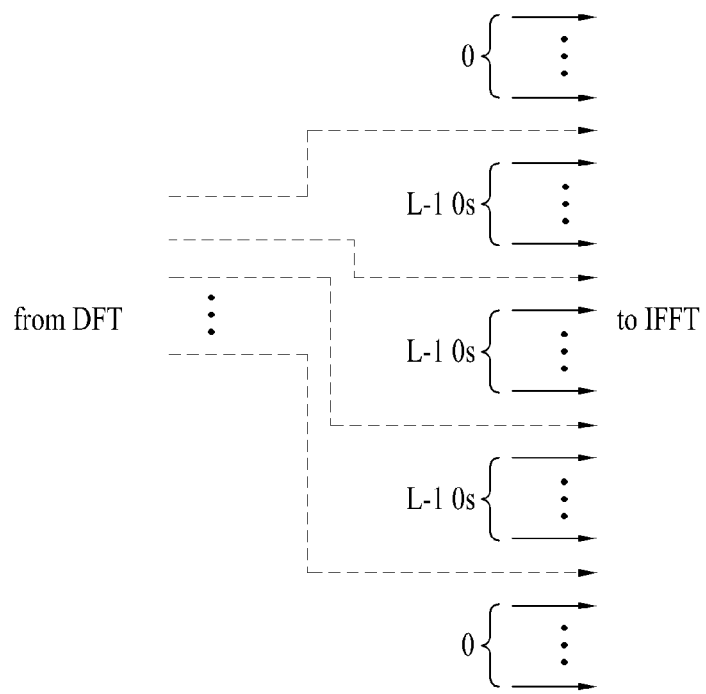

FIG. 5 illustrates a signal mapping method in a frequency domain to satisfy single carrier properties in the frequency domain.

FIG. 5(a) represents a localized mapping method and FIG. 5(b) represents a distributed mapping method. Clustered SC-FDMA, which is a modified version of SC-FDMA, classifies DFT process output samples into sub-groups and discretely maps the sub-groups to the frequency domain (or subcarrier domain) during a subcarrier mapping procedure.

Figure 6:
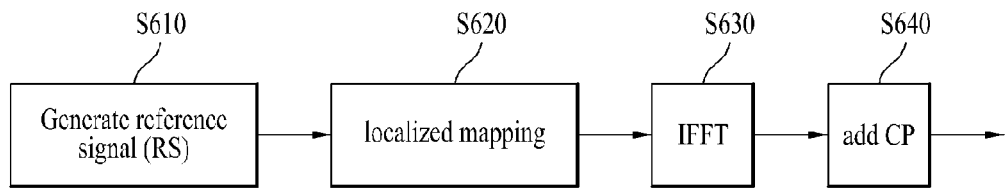
FIG. 6 is a block diagram for describing a reference signal transmission procedure for demodulating a transmit signal according to SC-FDMA.

FIG. 6 is a block diagram illustrating a procedure of transmitting a reference signal (RS) for demodulating a transmission signal according to SC-FDMA.

The LTE standard (e.g. 3GPP release 9) defines that an RS is generated in a frequency domain (S610) without being subjected to DFT, mapped to a subcarrier (S620), IFFT-processed (S630), subjected to CP attachment (S640), and then transmitted while data is transmitted in such a manner that a signal generated in a time domain is converted to a frequency domain signal through DFT, mapped to a subcarrier, IFFT-processed, and then transmitted (refer to FIG. 4).

Figure 7:
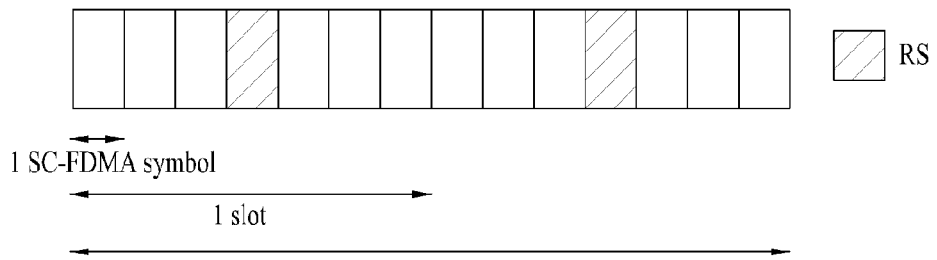
FIG. 7 shows a symbol position to which a reference signal is mapped in a subframe structure according to SC-FDMA.
Figure 7:
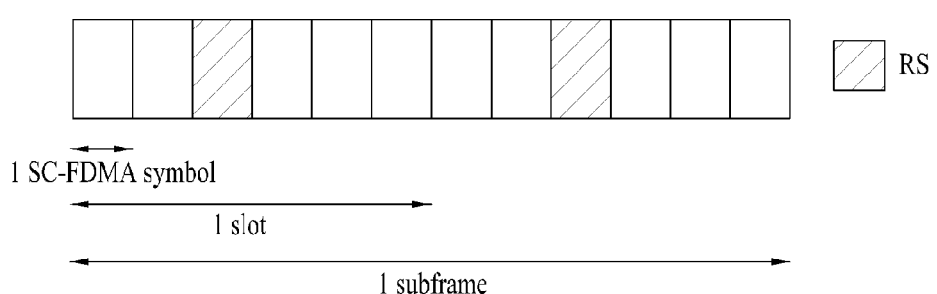

FIG. 7 shows a symbol position to which an RS is mapped in a subframe structure according to SC-FDMA.

FIG. 7(a) shows an RS located at the fourth SC-FDMA symbol in each of two slots in one subframe in the case of normal CP. FIG. 7(b) shows an RS located at the third SC-FDMA symbol of each of two slots in one subframe in the case of extended CP.

Figure 8:
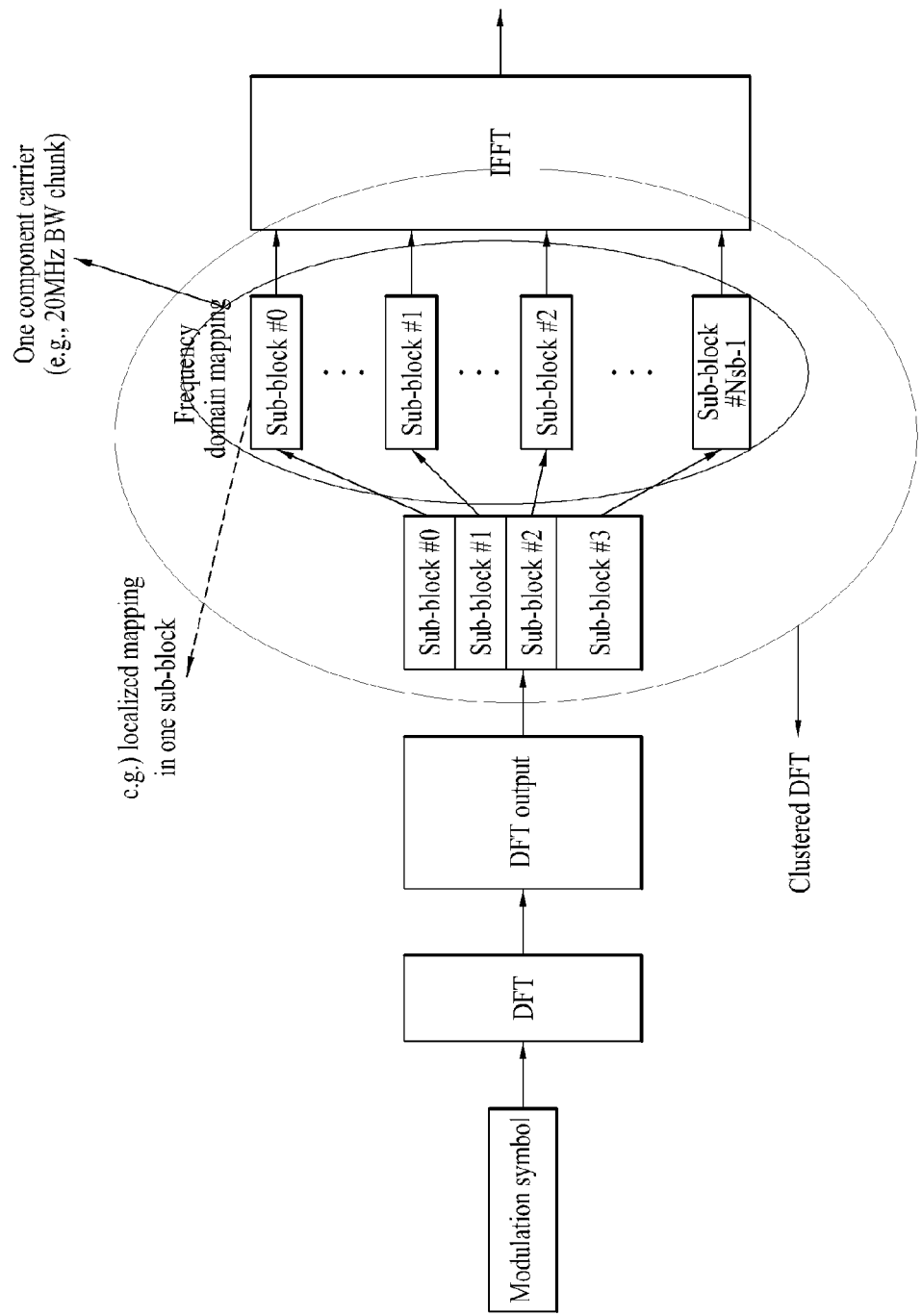
FIG. 8 shows a signal processing procedure for mapping DFT process output samples to a single carrier in clustered SC-FDMA.
Figure 9:
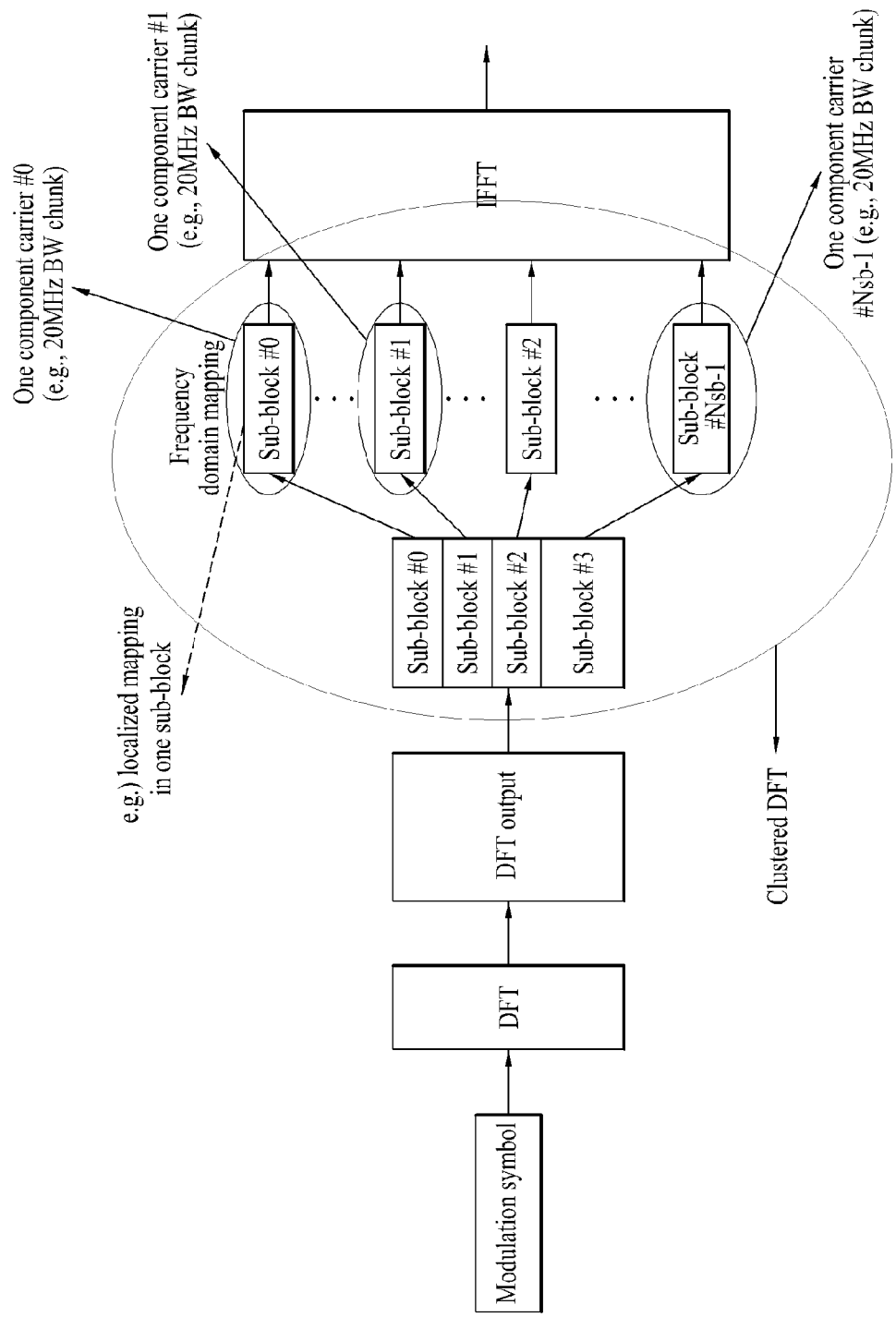
FIGS. 9 and 10 show a signal processing procedure for mapping DFT process output samples to multiple carriers in clustered SC-FDMA.
Figure 10:
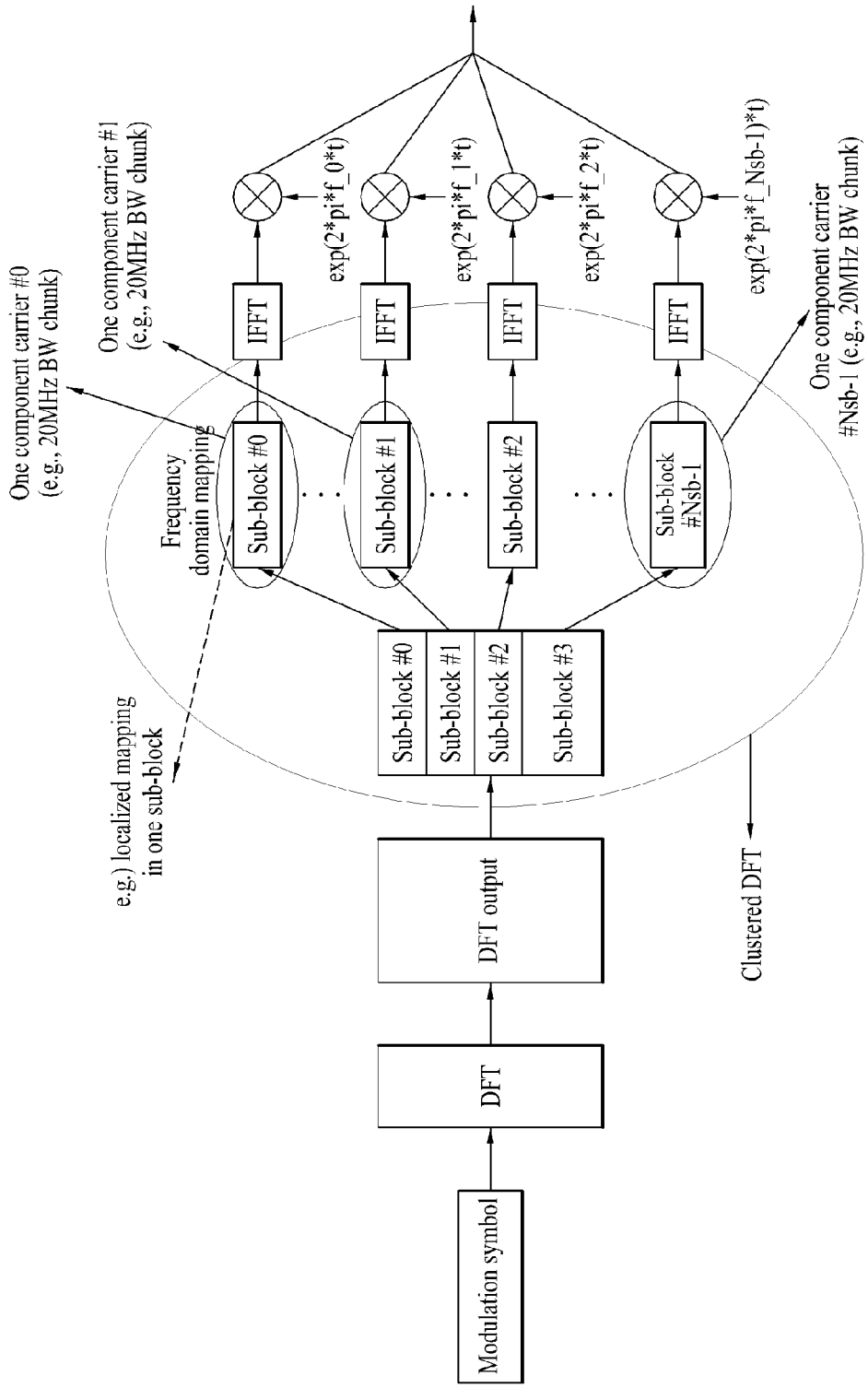

FIG. 8 illustrates a signal processing procedure of mapping DFT process output samples to a single carrier in clustered SC-FDMA and FIGS. 9 and 10 illustrate a signal processing procedure of mapping DFT process output samples to multiple carriers in clustered SC-FDMA.

FIG. 8 shows an example to which intra-carrier clustered SC-FDMA is applied and FIGS. 9 and 10 show an example to which inter-carrier clustered SC-FDMA is applied. FIG. 9 shows a case in which a signal is generated through a single IFFT block when subcarrier spacing between neighboring component carriers is aligned and component carriers are contiguously allocated in the frequency domain. FIG. 10 shows a case in which a signal is generated through a plurality of IFFT blocks when component carriers are non-contiguously allocated in the frequency domain.

Figure 11:
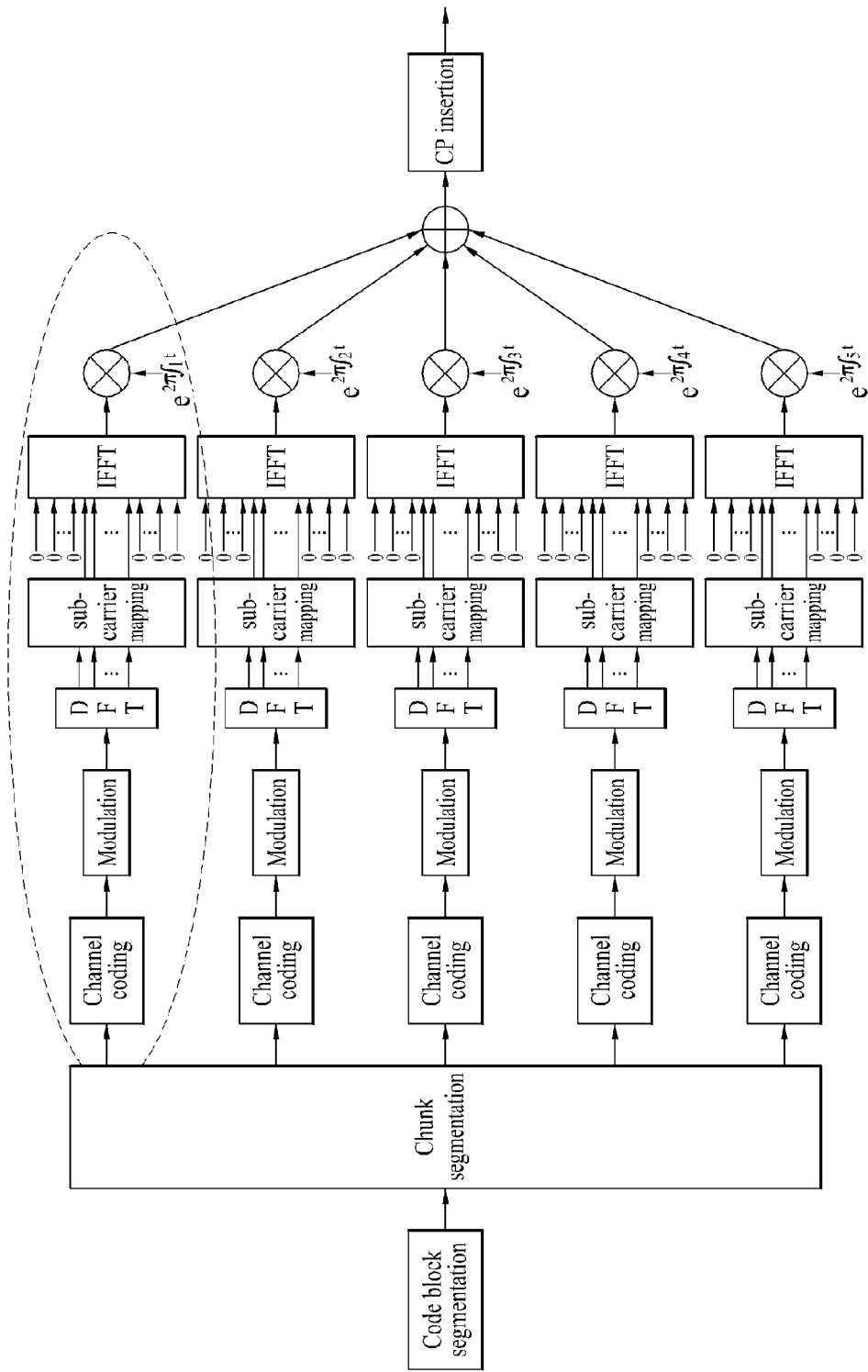
FIG. 11 shows a signal processing procedure of segmented SC-FDMA.

FIG. 11 illustrates a signal processing procedure of segmented SC-FDMA.

Segmented SC-FDMA employs as many IFFTs as the number of DFTs such that DFT and IFFT has one-to-one relationship to extend DFT spread and frequency subcarrier mapping of IFFT of SC-FDMA and may be referred to as NxSC-FDMA or NxDFT-s-OFDMA. The term segmented SC-FDMA is used in the specification. Referring to FIG. 11, the segmented SC-FDMA groups time domain modulation symbols into N (N being an integer greater than 1) groups and performs a DFT process group by group in order to relieve the single carrier property condition.

Figure 12:
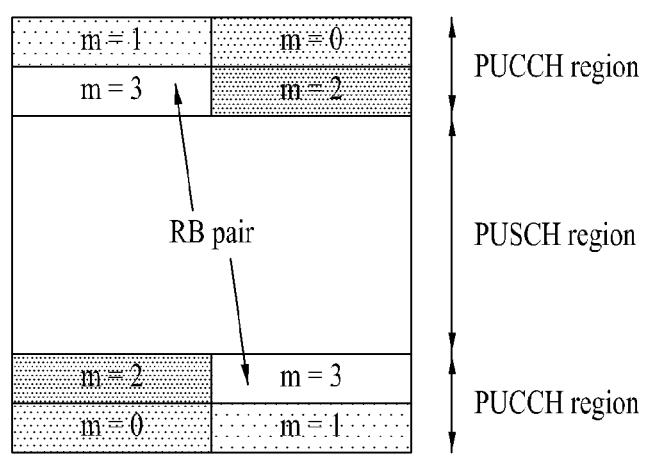
FIG. 12 illustrates a structure of an uplink subframe that can be used in embodiments of the present invention.

FIG. 12 shows a structure of an uplink subframe that can be used in embodiments of the present invention.

Referring to FIG. 12, the uplink subframe includes a plurality of slots (e.g. two slots). The number of SC-FDMA symbols included in each slot may depend on CP length. For example, a slot can include 7 SC-FDMA symbols in the case of normal CP.

The uplink subframe is segmented into a data region and a control region. The data region, which is for transmitting and receiving a PUSCH signal, is used to transmit an uplink data signal such as audio data. The control region, which is for transmitting and receiving a PUCCH signal, is used to transmit UCI.

PUCCH includes RB pairs (e.g. m=0, 1, 2, 3) located at both ends of the data region (e.g. RB pairs located at frequency mirrored portions) in the frequency domain and hopped on the basis of a slot. UCI includes HARQ ACK/NACK, channel quality information (CQI), precoding matrix indicator (PMI), rank indication (RI) information, etc.

Figure 13:
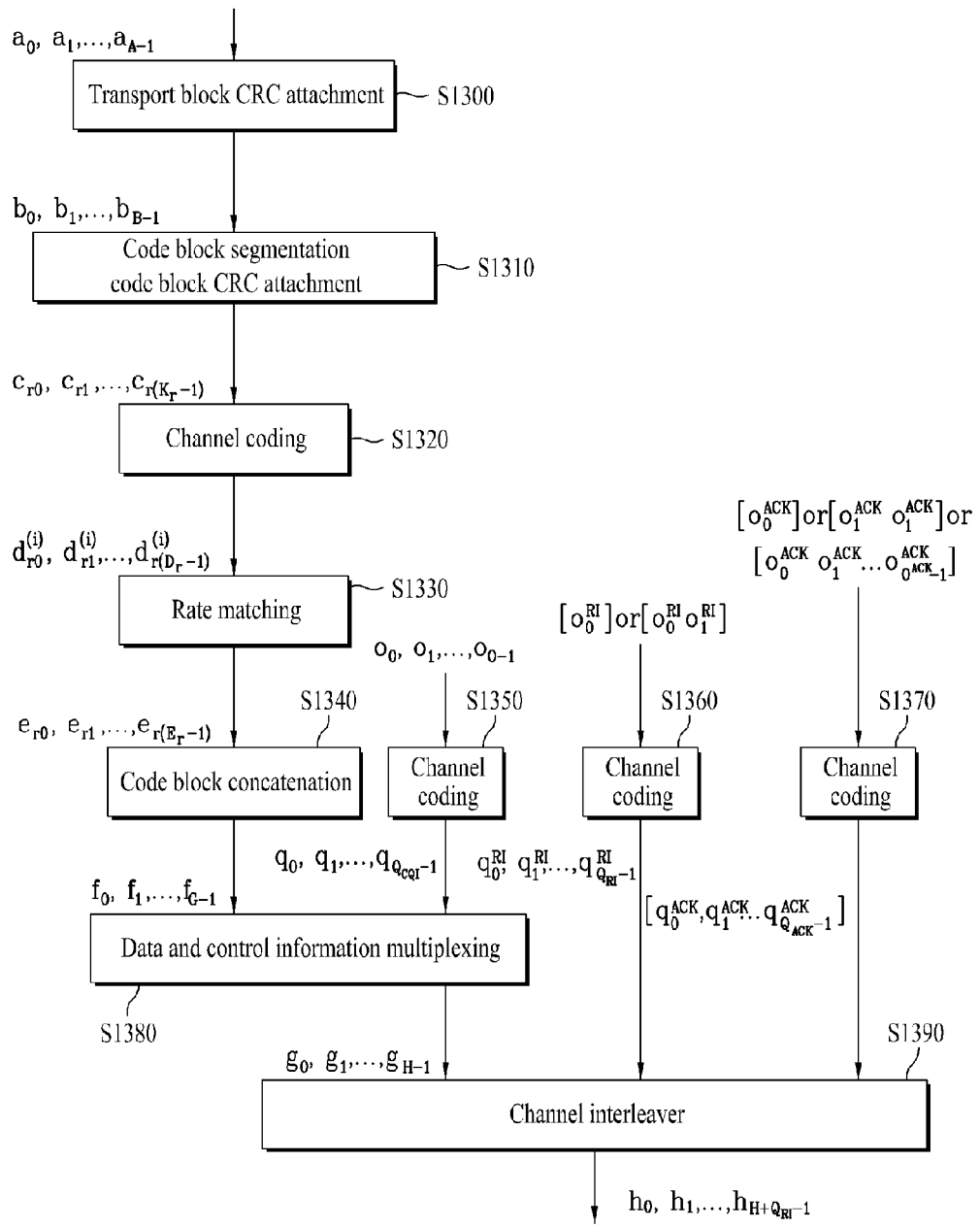
FIG. 13 illustrates a procedure of processing UL-SCH data and control information that can be used in embodiments of the present invention.

FIG. 13 illustrates a procedure of processing UL-SCH data and control information which can be used in the embodiments of the present invention.

Referring to FIG. 13, data transmitted through an UL-SCH is delivered in the form of a transport block (TB) to a coding unit for each transmission time interval (TTI).

Parity bits $p_0, p_1, p_2, p_3, \ldots, p_{L-1}$ are added to bits $a_0, a_1, a_2, a_3, \ldots, a_{A-1}$ of a TB received from a higher layer. Here, the size of the TB is A and the number of the parity bits is 24 (L=24). Input bits having a CRC attached thereto may be represented as $b_0, b_1, b_2, b_3, \ldots, b_{B-1}$ where B denotes the number of bits of the TB including the CRC (S1300).

The input bits $b_0, b_1, b_2, b_3, \ldots, b_{B-1}$ are segmented into code blocks (CBs) according to the TB size and a CRC is attached to each of the segmented CBs to obtain bits $c_{r0}, c_{r1}, c_{r2}, c_{r3}, \ldots, c_{r(K_r-1)}$. Here, r denotes a CB number (r=0, ..., C−1), $K_r$ denotes the number of bits of a CB r, and C represents the total number of CBs (s1310).

Channel coding is performed on $c_{r0}, c_{r1}, c_{r2}, c_{r3}, \ldots, c_{r(K_r-1)}$ input to a channel coding unit to generate $d_{r0}^{(i)}, d_{r1}^{(i)}, d_{r2}^{(i)}, d_{r3}^{(i)}, \ldots, d_{r(D_r-1)}^{(i)}$. Here, i (i=0, 1, 2) denotes an index of a coded data stream, denotes the number of bits of an i-th coded data stream, $D_r$ for the code block r (that is, $D_r=K_r+4$), r represents CB number, and C represents the total number of CBs. In the embodiments of the present invention, each CB can be channel-coded using turbo-coding (S1320).

Upon completion of the channel coding, rate matching is performed to generate $e_{r0}, e_{r1}, e_{r2}, e_{r3}, \ldots, e_{r(E_r-1)}$. Here, denotes the number of rate-matched bits of an r-th CB (r=0, 1, ..., C−1), and C denotes the total number of CBs (S1330).

After rate matching, CB concatenation is performed to result in bits $f_0, f_1, f_2, f_3, \ldots, f_{G-1}$. Here, G represents the total number of coded bits. When the control information is multiplexed with the UL-SCH data and transmitted, bits used to transmit the control information are not included in G. Bits $f_0, f_1, f_2, f_3, \ldots, f_{G-1}$ correspond to a UL-SCH codeword (S1340).

CQI and/or PMI, RI and HARQ-ACK of the UCI are independently channel-coded (s1350, 51360 and S1370). Channel coding of UCI is performed on the basis of the number of coded symbols for UCI. For example, the number of coded symbols can be used for rate matching of coded control information. The number of coded symbols corresponds to the number of modulation symbols and the number of REs.

The CQI is channel-coded using an input bit sequence $o_0, o_1, o_2, \ldots, o_{O-1}$ (S1350) to result in an output bit sequence $q_0, q_1, q_2, q_3, \ldots, q_{Q_{CQI}-1}$. A channel coding scheme for the CQI depends on the number of bits of the CQI. When the CQI has 11 bits or more, an 8-bit CRC is added to the CQI. In the output bit sequence, $Q_{CQI}$ denotes the total number of coded bits for the CQI. The coded CQI can be rate-matched in order to match the length of the bit sequence to $Q_{CQI}$. $Q_{CQI}=Q'_{CQI} \times Q_m$ where $Q'_{CQI}$ is the number of coded symbols for the CQI and $Q_m$ is the modulation order. $Q_m$ of the CQI is equal to that of the UL-SCH data.

The RI is channel-coded using an input bit sequence $[o_0^{RI}]$ Or $[o_0^{RI} \; o_1^{RI}]$ (S1360). Here, $[o_0^{RI}]$ and $[o_0^{RI} \; o_1^{RI}]$ denote 1-bit RI and 2-bit RI, respectively.

In the case of 1-bit RI, repetition coding is used. For the 2-bit RI, (3,2) simplex code is used for coding and encoded data can be cyclically repeated. RI having 3 to 11 bits is coded using (32,0) RM code used in an uplink shared channel. RI having 12 bits or more is divided into two groups using a double RM structure and each group is coded using the (32,0) RM code. An output bit sequence $q_0^{RI}, q_1^{RI}, q_2^{RI}, \ldots, q_{Q_{RI}-1}^{RI}$ is obtained by concatenating coded RI blocks. Here, $Q_{RI}$ represents the total number of coded bits for the RI. The coded RI block finally concatenated may be part of the RI in order to match the length of the coded RI to $Q_{RI}$ (that is, rate matching). $Q_{RI}=Q'_{RI} \times Q_m$ where $Q'_{RI}$ is the number of coded symbols for the RI and $Q_m$ is the modulation order. $Q_m$ of the RI is equal to that of the UL-SCH data.

HARQ-ACK is channel-coded using an input bit sequence $[o_0^{ACK}]$, $[o_0^{ACK} \; o_1^{ACK}]$ or $[o_0^{ACK} \; o_1^{ACK} \ldots o_{O^{ACK}-1}^{ACK}]$ (S1370). $[o_0^{ACK}]$ and $[o_0^{ACK} \; o_1^{ACK}]$ respectively mean 1-bit HARQ-ACK and 2-bit HARQ-ACK. $[o_0^{ACK} \; o_1^{ACK} \ldots o_{O^{ACK}-1}^{ACK}]$ represents HARQ-ACK composed of information of more than two bits (that is, $O^{ACK} > 2$).

At this time, ACK is coded into 1 and NACK is coded into 0. 1-bit HARQ-ACK is coded using repetition coding. 2-bit HARQ-ACK is coded using a (3,2) simplex code and encoded data can be cyclically repeated. HARQ-ACK having 3 to 11 bits is coded using a (32,0) RM code used in an uplink shared channel. HARQ-ACK of 12 bits or more is divided into two groups using a double RM structure and each group is coded using a (32,0) RM code. $Q_{ACK}$ denotes the total number of coded bits for the HARQ-ACK and a bit sequence $q_0^{ACK}, q_1^{ACK}, q_2^{ACK}, \ldots, q_{Q_{ACK}-1}^{ACK}$ is obtained by concatenating coded HARQ-ACK blocks. The coded HARQ-ACK block finally concatenated may be part of the HARQ-ACK in order to match the length of the bit sequence to $Q_{ACK}$ (that is, rate matching). $Q_{ACK}=Q'_{ACK} \times Q_m$ where $Q'_{ACK}$ is the number of coded symbols for the HARQ-ACK and $Q_m$ is the modulation order. $Q_m$ of the HARQ-ACK is equal to that of the UL-SCH data.

Coded UL-SCH bits $f_0, f_1, f_2, f_3, \ldots, f_{G-1}$ and coded CQI/PMI bits $q_0, q_1, q_2, q_3, \ldots, q_{Q_{CQI}-1}$ are input to a data/control multiplexing block (S1380). The data/control multiplexing block outputs $g_0, g_1, g_2, g_3, \ldots, g_{H'-1}$. Here, $g_i$ is a column vector having a length of $Q_m$ (i=0, ..., H'−1). $g_i$ (i=0, ..., H'−1) represents a column vector having a length of $(Q_m \cdot N_L)$. H=(G+$N_L \cdot Q_{CQI}$) and H'=H/($N_L \cdot Q_m$). $N_L$ denotes the number of layers to which the UL-SCH TB is mapped and H denotes the total number of coded bits allocated to the $N_L$ transport layers to which the UL-SCH TB is mapped for the UL-SCH data and CQI/PMI. That is, H is the total number of coded bits allocated for the UL-SCH data and CQI/PMI.

A channel interleaver channel-interleaves coded bits input thereto. The input of the channel interleaver includes the output of the data/control multiplexing block, $g_0, g_1, g_2, \ldots, g_{H'-1}$, the coded RI $q_0^{RI}, q_1^{RI}, q_2^{RI}, \ldots, q_{Q'_{RI}-1}^{RI}$, and the coded HARQ-ACK $q_0^{ACK}, q_1^{ACK}, q_2^{ACK}, \ldots, q_{Q'_{ACK}-1}^{ACK}$ (S1390).

In step S1390, $g_i$ (i=0, ..., H'−1) is the column vector having a length of $Q_m$ for the CQI/PMI, $q_i^{ACK}$ (i=0, ..., $Q'_{ACK}-1$) is a column vector of a length of $Q_m$ for the ACK/NACK, and $q_i^{RI}$ ($Q'_{RI}=Q_{RI}/Q_m$) is a column vector having a length of $Q_m$ for the RI.

The channel interleaver multiplexes the control information and/or the UL-SCH data for PUSCH transmission. Specifically, the channel interleaver maps the control information and the UL-SCH data to a channel interleaver matrix corresponding to the PUSCH resource.

Upon completion of channel interleaving, a bit sequence $h_0, h_1, h_2, \ldots, h_{H+Q_{RI}-1}$ is output column by column from the channel interleaver matrix. The output bit sequence $h_0, h_1, h_2, \ldots, h_{H+Q_{RI}-1}$ is mapped onto a resource grid.

Figure 14:
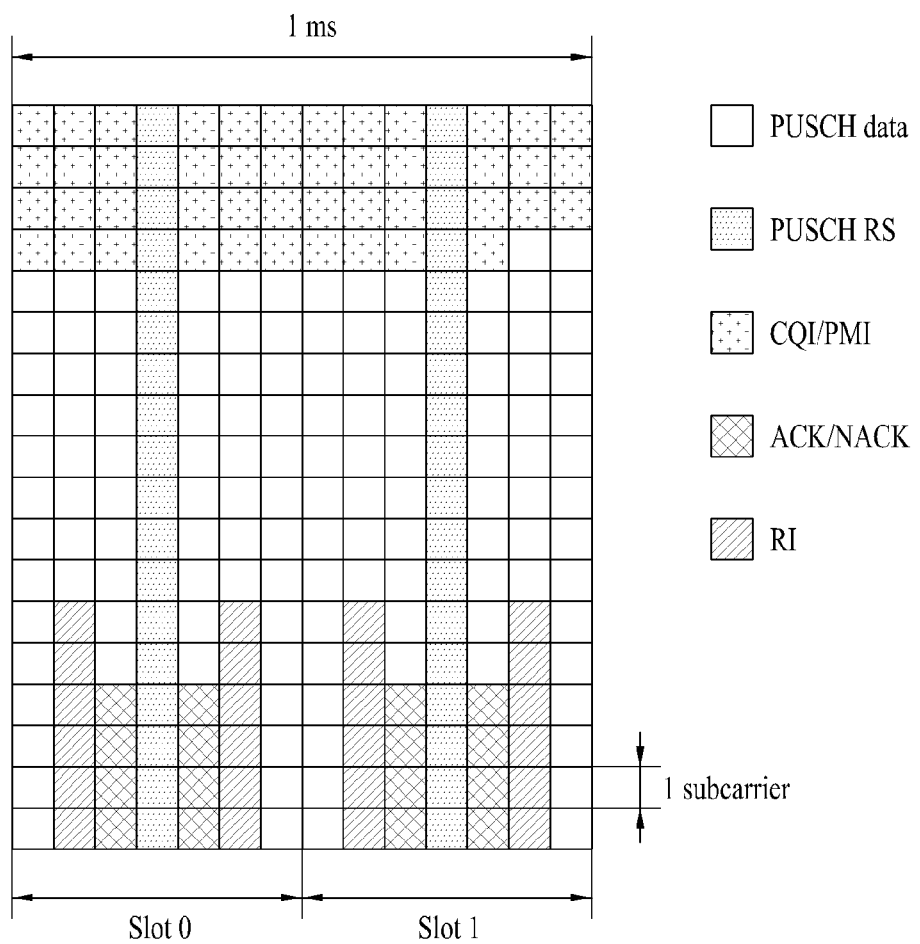
FIG. 14 illustrates an exemplary method for multiplexing UCI and UL-SCH data on a PUSCH.

FIG. 14 illustrates an exemplary method of multiplexing UCI and UL-SCH data on a PUSCH.

When a UE attempts to transmit control information in a subframe assigned for PUSCH transmission, the UE multiplexes the UCI and UL-SCH data prior to DFT-spreading. The UCI includes at least one of CQI/PMI, HARQ-ACK/NACK and RI.

The numbers of REs used to transmit the CQI/PMI, HARQ-ACK/NACK and RI are based on a modulation and coding scheme (MCS) and offset values $\Delta_{offset}^{CQI}$, $\Delta_{offset}^{HARQ-ACK}$, and $\Delta_{offset}^{RI}$ allocated for PUSCH transmission. The offset values permit different coding rates according to control information and are semi-statically set by a higher layer (e.g. RRC layer) signal. The UL-SCH data and control information are not mapped to the same RE. The control information is mapped such that it is present in two slots of a subframe, as shown in FIG. 14. A BS can easily demultiplex the control information and data packet since it can be aware of transmission of the control information through the PUSCH in advance.

Referring to FIG. 14, CQI and/or PMI (CQI/PMI) resources are located at the beginning of a UL-SCH data resource, sequentially mapped to all SC-FDMA symbols on one subcarrier and then mapped to the next subcarrier. The CQI/PMI are mapped from the left to the right in subcarriers, that is, in a direction in which the SC-FDMA symbol index increases. PUSCH data (UL-SCH data) is rate-matched in consideration of the quantity of the CQI/PMI resources (i.e., the number of coded symbols). The CQI/PMI uses the same modulation order as that of the UL-SCH data.

For example, when the CQI/PMI has a small information size (payload size) (e.g. less than 11 bits), (32, k) block code is used for the CQI/PMI, similarly to PUCCH data transmission, and coded data can be cyclically repeated. For CQI/PMI having a small information size, a CRC is not used.

If the CQI/PMI has a large information size (e.g. greater than 11 bits), an 8-bit CRC is added to the CQI/PMI and channel coding and rate matching are performed using a tail-biting convolutional code. The ACK/NACK is inserted into part of SC-FDMA resources to which the UL-SCH data is mapped through puncturing. The ACK/NACK is located next to an RS and filled in corresponding SC-FDMA symbols from the bottom to the top, that is, in a direction in which the subcarrier index increases.

In the case of normal CP, SC-FDMA symbols for ACK/NACK correspond to SC-FDMA symbols #2 and #4 in each slot, as shown in FIG. 14. The coded RI is located next to symbols (i.e., symbols #1 and #5) for the ACK/NACK irrespective of whether the ACK/NACK is practically transmitted in the subframe. Here, the ACK/NACK, RI and CQI/PMI are independently coded.

Figure 15:
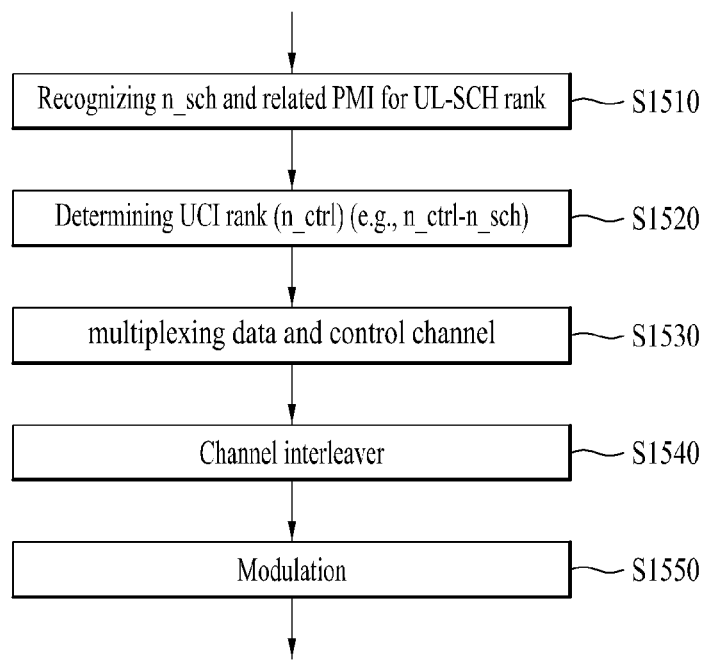
FIG. 15 is a flowchart illustrating a procedure of multiplexing control information and UL-SCH data in a multiple input multiple output (MIMO) system.

FIG. 15 is a flowchart illustrating a procedure of multiplexing control information and UL-SCH data in a MIMO system.

Referring to FIG. 15, a UE identifies a rank n_sch for a UL-SCH (data part) and PMI related to the rank from scheduling information for PUSCH transmission (S1510). The UE determines a rank n_ctrl for UCI (S1520). The rank of the UCI can be set such that it is equal to that of the UL-SCH (n_ctrl=n_sch). However, the present invention is not limited thereto. The data and control channel are multiplexed (S1530). A channel interleaver performs time-first-mapping and punctures regions around a DM-RS to map ACK/NACK/RI (S1540). Then, the data and control channel are modulated according to an MCS table (S1540). The modulation scheme may include QPSK, 16QAM, and 64QAM, for example. The order/position of the modulation may be changed (e.g. before multiplexing of the data and control channel).

Figure 16:
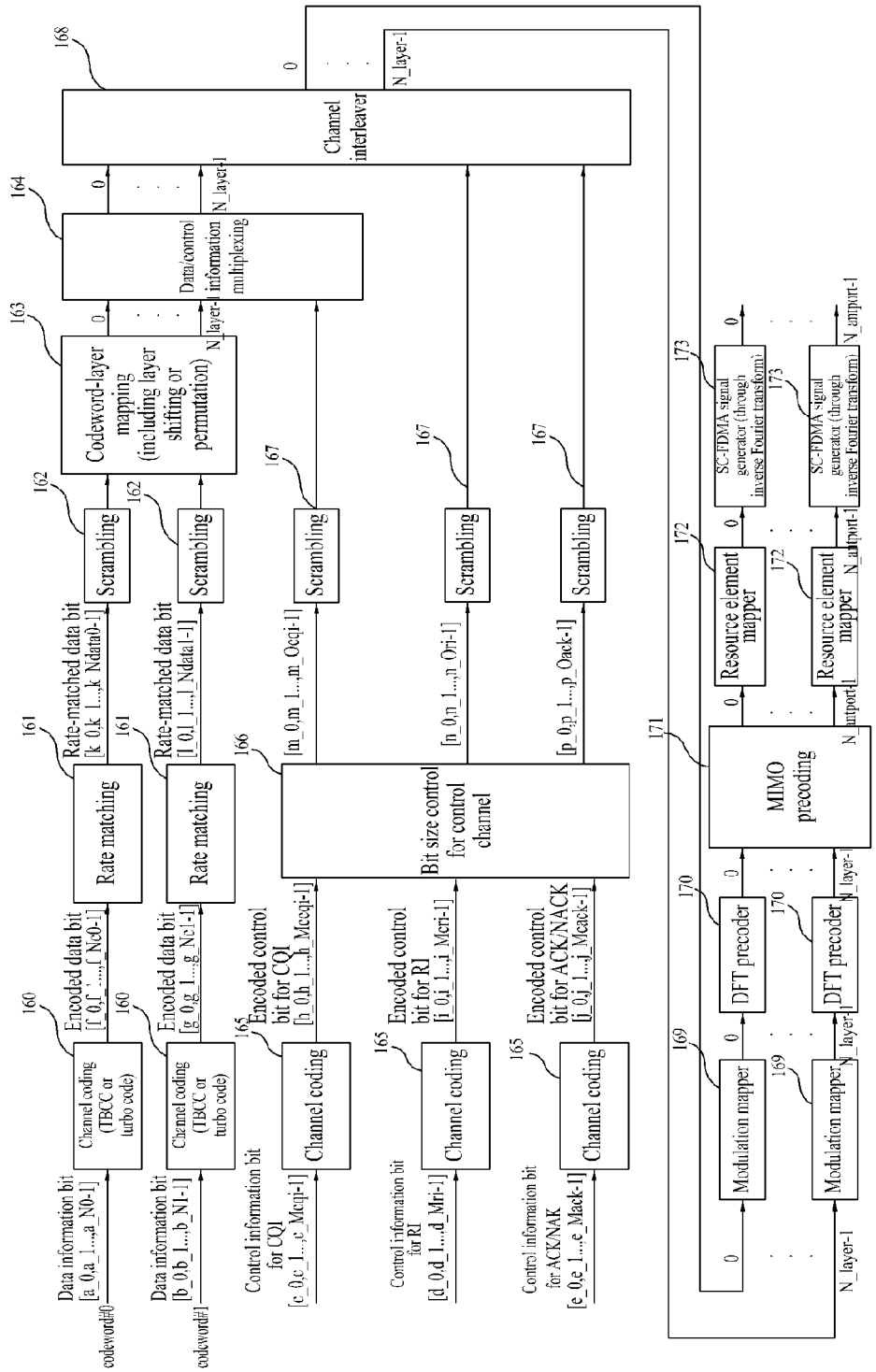
FIGS. 16 and 17 illustrate an exemplary method for multiplexing a plurality of UL-SCH TBs and UCI by a UE according to an embodiment of the present invention.
Figure 17:
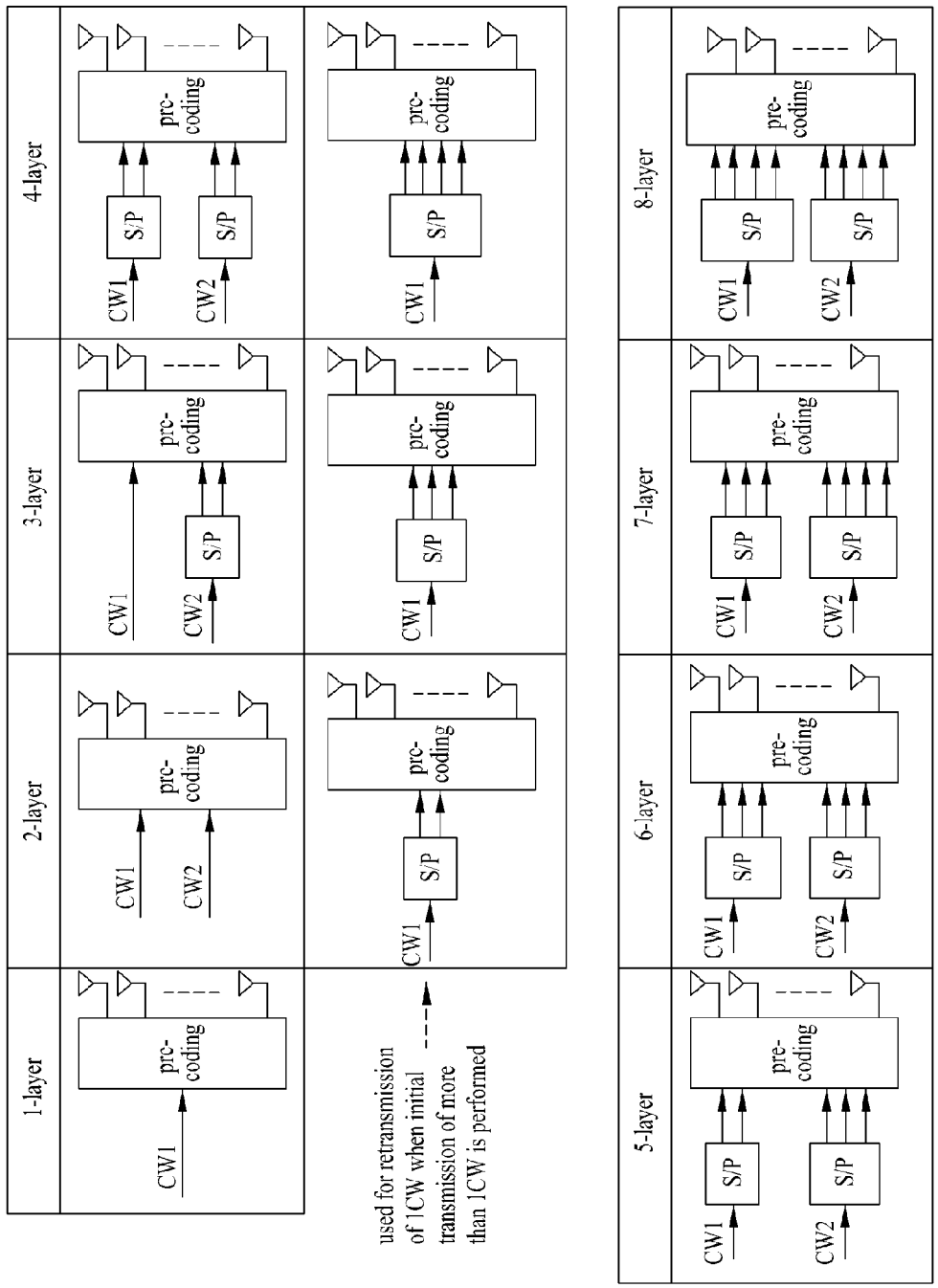

FIGS. 16 and 17 illustrate an exemplary method for multiplexing and transmitting a plurality of UL-SCH TBs and UCI by a UE according to an embodiment of the present invention.

While FIGS. 16 and 17 illustrate a case in which two codewords are transmitted for convenience, the method shown in FIGS. 16 and 17 can be applied to transmission of one or three or more codewords. A codeword and a TB correspond to each other and are used interchangeably in the specification. Since a basic procedure of the method is identical/similar to the procedure described above with reference to FIGS. 13 and 14, a description will be given of part related to MIMO.

Assuming that two codewords are transmitted in FIG. 16, channel coding is performed on each codeword (160). Rate matching is carried out according to a given MCS level and resource size (161). Encoded bits may be cell-specifically, UE-specifically or codeword-specifically scrambled (162). Then, codeword-to-layer mapping is performed (163). The codeword-to-layer mapping may include layer shifting or permutation.

The codeword-to-layer mapping performed in the functional block 163 may use a codeword-to-layer mapping method shown in FIG. 17. The position of precoding performed in FIG. 17 may be different from the position of precoding in FIG. 13.

Referring back to FIG. 16, the control information such as CQI, RI and ACK/NACK is channel-coded in a channel coding block (165) according to predetermined specifications. Here, the CQI, RI and ACK/NACK can be coded using the same channel code for all the codewords or coded using different channels codes specific to the codewords.

The number of the encoded bits may be changed by a bit side controller 166. The bit size controller 166 may be unified with the channel coding block 165. A signal output from the bit size controller 166 is scrambled (167). The scrambling can be performed cell-specifically, layer-specifically, codeword-specifically or UE-specifically.

The bit size controller 166 can operate as follows.

(1) The bit size controller recognizes a rank n_rank_pusch of data for a PUSCH.

(2) A rank n_rank_control of a control channel is set to correspond to the rank of the data (i.e., n_rank_control=n_rank_pusch) and the number of bits (n_bit_ctrl) for the control channel is extended by multiplying it by the rank of the control channel.

This is performed by simply copying the control channel to repeat the control channel. At this time, the control channel may be an information level prior to channel coding or an encoded bit level after channel coding. In the case of a control channel [a0, a1, a2, a3] having n_bit_ctrl=4 and a data rank of n_rank_pusch=2, for example, the extended number of bits (n_ext_ctrl) of the control channel can be 8 bits [a0, a1, a2, a3, a0, a1, a2, a3].

Alternatively, a circular buffer scheme may be applied such that the extended number of bits (n_ext_ctrl) becomes 8 bits.

When the bit size controller 166 and channel encoder 165 are unified, encoded bits can be generated using channel coding and rate matching defined in the existing system (e.g. LTE Rel-8).

In addition to the bit size controller 166, bit level interleaving may be performed to further randomize layers. Equivalently, interleaving may be carried out at the modulation symbol level.

CQI/PMI channels and control information (or control data) with respect to the two codewords can be multiplexed by a data/control multiplexer 164. Then, a channel interleaver 168 maps the CQI/PMI according to the time-first-mapping scheme such that ACK/NACK information is mapped to REs around an uplink DM-RS in each of two slots in one subframe.

A modulation mapper 169 modulates each layer and a DFT precoder 170 performs DFT precoding. A MIMO precoder 171 carries out MIMO precoding and a resource element mapper 172 sequentially executes RE mapping. Then, an SC-FDMA signal generator 173 generates an SC-FDMA signal and transmits the generated signal through an antenna port.

The positions of the aforementioned functional blocks are not limited to locations shown in FIG. 16 and can be changed. For example, the scrambling blocks 162 and 167 can follow the channel interleaving block 168 and the codeword-to-layer mapping block 163 can follow the channel interleaving block 168 or the modulation mapper 169.

2. Multi-carrier Aggregation Environment

Communication environments considered in the embodiments of the present invention include multi-carrier environments. A multi-carrier system or a carrier aggregation system used in the present invention means a system that uses aggregation of one or more component carriers (CCs) having bandwidths narrower than a target bandwidth to support broadband.

Multi-carrier means carrier aggregation (carrier concatenation in the present invention. The carrier aggregation includes concatenation of non-contiguous carriers as well as concatenation of contiguous carriers. Furthermore, carrier concatenation can be used interchangeably with the terms "carrier aggregation", "bandwidth concatenation", etc.

Multi-carrier (i.e. carrier aggregation) composed of two or more CCs aims to support up to 100 MHz in the LTE-A system. When one or more carriers having bandwidths narrower than a target bandwidth are aggregated, the bandwidths of the aggregated carriers can be limited to the bandwidth used in the existing system in order to maintain backwards compatibility with the existing IMT system.

For example, the 3GPP LTE system supports {1, 4, 3, 5, 10, 15, 20}MHz and the 3GPP LTE-Advanced system (LTE-A) supports bandwidths wider than 20 MHz using the bandwidths supported by LTE. The multi-carrier system used in the present invention can define a new bandwidth irrespective of the bandwidths used in the existing systems to support carrier aggregation.

The LTE-A system uses the concept of the cell to manage radio resources. The cell is defined as a combination of downlink resources and uplink resources. The uplink resources are not an essential element, and thus the cell may be composed of downlink resources only. If multi-carrier (i.e. carrier aggregation) is supported, linkage between a carrier frequency (or DL CC) of the downlink resource and a carrier frequency (or UL CC) of the uplink resource can be indicated by system information (SIB).

Cells used in the LTE-A system include a primary cell (P cell) and a secondary cell (S cell). The P cell may mean a cell operating at a primary frequency (e.g., primary CC (PCC)) and the S cell may mean a cell operating at a secondary frequency (e.g., secondary CC (SCC)). For a specific UE, only one P cell and one or more S cells can be allocated.

The P cell is used for a UE to perform an initial connection establishment procedure or a connection re-establishment procedure. The P cell may mean a cell designated during a handover procedure. The S cell can be configured after RRC connection is established and used to provide additional radio resources.

The P cell and the S cell can be used as serving cells. For a UE for which carrier aggregation is not set although the UE is in an RRC-connected state or a UE which does not support carrier aggregation, only one serving cell configured with only the P cell is present. In the case of a UE in an RRC-connected state, for which carrier aggregation is set, one or more serving cells can be present and the serving cells include the P cell and one or more S cells.

Upon beginning an initial security activation procedure, an E-UTRAN can establish a network including one or more S cells in addition to the P cell initially configured in a connection establishment procedure. In a multi-carrier environment, the P cell and S cell can operate as component carriers. That is, carrier aggregation can be understood as a combination of the P cell and one or more S cells. In the following embodiments, the PCC corresponds to the P cell and the SCC corresponds to the S cell.

3. Uplink Control Information Transmission Method

The embodiments of the present invention relate to a method for channel-coding UCI, a method for allocating resources to the UCI and a method for transmitting the UCI when the UCI piggybacks on data on a PUSCH in a CA environment. The embodiments of the present invention can be applied to SU-MIMO and, especially, to a single-antenna transmission environment as a special case of SU-MIMO.

3.1 UCI Allocation Position on PUSCH

Figure 18:
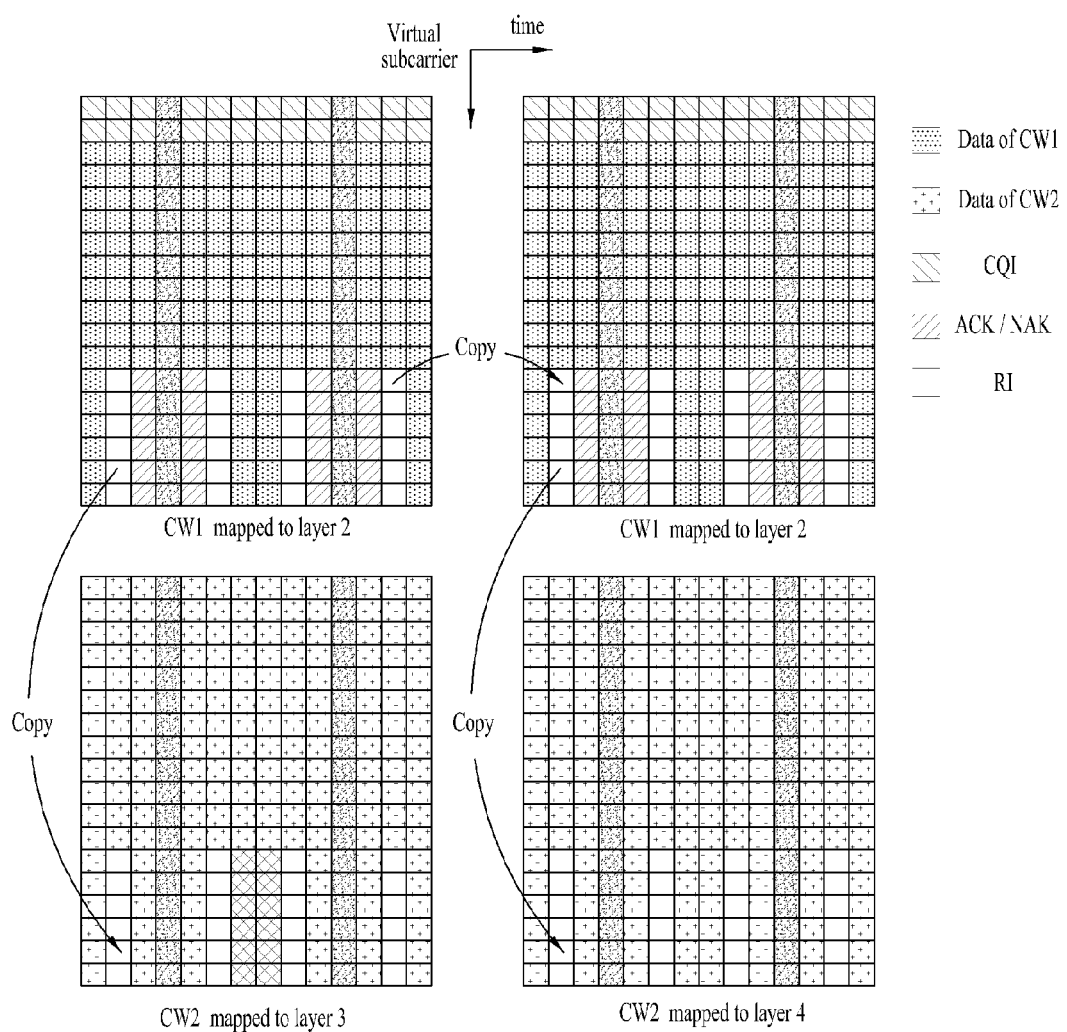
FIG. 18 illustrates a method for mapping physical resource elements to transmit uplink data and UCI.

FIG. 18 illustrates an exemplary method for mapping physical resource elements in order to transmit uplink data and UCI.

FIG. 18 shows a UCI transmission method in the case of 2 codewords and 4 layers. Referring to FIG. 18, CQI is combined with data and mapped to REs other than REs to which RI is mapped through the time-first-mapping scheme using the same modulation order as the data and all constellation points. In SU-MIMO, the CQI is spread in one codeword to be transmitted. For example, the CQI is transmitted in a codeword having a higher MCS level among the two codewords and transmitted in codeword 0 when the two codewords have the same MCS level.

ACK/NACK is arranged while puncturing combinations of the CQI and data, which have been mapped to symbols located on both sides of reference signals. Since the reference signals are located at third and tenth symbols, the ACK/NACK is mapped from the lowest subcarriers of second, fourth, ninth and eleventh symbols to the top. Here, ACK/NACK is mapped in the order of the second, eleventh, ninth and fourth symbols.

RI is mapped to symbols located next to the ACK/NACK. The RI is the first to be mapped among all information items (data, CQI, ACK/NACK, RI) transmitted on the PUSCH. Specifically, the RI is mapped from the lowest subcarriers of first, fifth, eighth and twelfth symbols to the top. Here, the RI is mapped in the order of the first, twelfth, eighth and fifth symbols.

Particularly, the ACK/NACK and RI can be mapped using only four corners of constellation through QPSK when their information bits are 1 bit or 2 bits and mapped using the same modulation order as the data and all constellation points when their information bits are 3 bits or more. In addition, the ACK/NACK and RI transmit the same information using the same resource at the same position in all layers.

3.2 Calculation of the Number of Coded Modulation Symbols for HARQ-ACK Bits or RI-1

In the embodiments of the present invention, the number of modulation symbols may correspond to the number of coded symbols or the number of REs.

Control information or control data is input to the channel coding block (e.g., S1350, S1360 and S1370 of FIG. 13 or 165 of FIG. 16) in the form of channel quality control information (CQI and/or PMI), HARQ/ACK and RI. Different numbers of encoded symbols are allocated for control information transmission, and thus coding rate depends on the control information. When the control information is transmitted in a PUSCH, control information bits $o_0, o_1, o_2, \ldots, o_{o-1}$ of HARQ-ACK, RI and CQI (or PMI) which are uplink channel state information (CSI) are independently channel-coded.

When a UE transmits ACK/NACK (or RI) information bits though a PUSCH, the number of REs per layer for the ACK/NACK (or RI) can be calculated by Equation 1.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right)$$ [Equation 1]

In Equation 1, the number of REs for the ACK/NACK (or RI) can be represented as the number of coded modulation symbols, Q'. Here, O represents the number of bits of the ACK/NACK (or RI), and $\beta_{offset}^{HARQ-ACK}$ and $\beta_{offset}^{RI}$ are determined by the number of transmission codewords according to TB. Parameters for setting an offset value for considering an SNR difference between data and UCI are determined as $\beta_{offset}^{PUSCH} = \beta_{offset}^{HARQ-ACK}$ and $\beta_{offset}^{PUSCH} = \beta_{offset}^{RI}$.

$M_{sc}^{PUSCH}$ represents a scheduled bandwidth for PUSCH transmission in the current subframe for a TB, as the number of subcarriers. $N_{symb}^{PUSCH-initial}$ represents the number of SC-FDMA symbols per subframe for initial PUSCH transmission for the same TB, and $N_{sc}^{PUSCH-initial}$ represents the number of subcarriers per subframe for initial PUSCH transmission. $N_{symb}^{PUSCH-initial}$ can be calculated by Equation 2.

$$N_{symb}^{PUSCH-initial} = (2 \cdot (N_{symb}^{UL} - 1) - N_{SRS})$$ [Equation 2]

Here, $N_{SRS}$ can be set to 1 when the UE transmits the PUSCH and SRS in the same subframe for initial transmission or when PUSCH resource allocation for the initial transmission even partially overlaps with the subframe and frequency bandwidth of a cell-specific SRS, and set to 0 otherwise.

The number of subcarriers of the TB for initial transmission, $M_{sc}^{PUSCH-initial}$, the total number of code blocks derived from the TB, C, and the size of each code block, $K_r^{(x)}$ (x={0, 1}), can be obtained from the initial PDCCH for the same TB.

When the initial PDCCH (DCI format 0 or 4) does not include the above values, these values can be determined by other methods. For example, $M_{sc}^{PUSCH-initial}$, C and $K_r^{(x)}$ (x={0,1}) can be determined from the latest semi-persistently scheduled PDCCH when the initial PUSCH for the same TB is semi-persistently scheduled. Otherwise, when the PUSCH is initiated according to a random access response grant, the values can be determined from a random access response grant for the same TB.

When the number of REs for ACK/NACK (or RI) has been obtained as described above, the number of bits can be calculated in consideration of a modulation scheme after channel coding of the ACK/NACK (or RI). The total number of coded bits of the ACK/NACK is $Q_{ACK} = Q_m \cdot Q'$ and the total number of coded bits of the RI is $Q_{RI} = Q_m \cdot Q'$. Here, $Q_m$ is the number of bits per symbol according to modulation order and corresponds to 2 in the case of QPSK, 4 in the case of 16QAM, and 6 in the case of 64QAM.

When SNR or spectral efficiency is high, a minimum value of REs allocated to the ACK/NACK and RI can be determined in order to prevent rate matching from acting as puncturing to make a minimum length of a codeword coded with Reed-Muller (RM) code zero. At this time, the minimum value of the REs may depend on the information bit size of the ACK/NACK or RI.

3.3 Calculation of the Number of Coded Modulation Symbols for CQI and/or PMI-1

When a UE transmits CQI and/or PMI (CQI/PMI) bits over a PUSCH, the number of REs for the CQI/PMI per layer can be calculated by Equation 3.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}}{Q_m}\right)$$ [Equation 3]

In Equation 3, the number of REs for the CQI and/or PMI can be represented as the number of modulation coded symbols, Q' for channel quality information. While the following description will mainly focus on CQI, the present invention can be applied to PMI in the same manner.

In Equation 3, O represents the number of bits of the CQI/PMI and L represents the number of bits of a CRC attached to the CQI bits. Here, L is 0 when O is 11 bits or less and is 8 otherwise. That is, $$L = \begin{cases} 0 & O \leq 11 \\ 8 & \text{otherwise.} \end{cases}$$

$\beta_{offset}^{CQI}$ is determined by the number of transport codewords for the corresponding PUSCH and a parameter for determining an offset value for considering an SNR difference between data and UCI is determined as $\beta_{offset}^{PUSCH} = \beta_{offset}^{CQI}$.

$M_{sc}^{PUSCH}$ represents a scheduled bandwidth for PUSCH transmission in the current subframe for the TB, as the number of subcarriers. $N_{symb}^{PUSCH}$ denotes the number of SC-FDMA symbols in the current subframe transmitting the PUSCH and can be calculated by the aforementioned Equation 2.

$N_{symb}^{PUSCH-initial}$ represents the number of SC-FDMA symbols per initial PUSCH transmission subframe for the same TB and $M_{sc}^{PUSCH-initial}$ denotes the number of subcarriers for the corresponding subframe. For $K_r^{(x)}$, x indicates the index of a TB having a highest MCS, designated by an uplink grant.

$M_{sc}^{PUSCH-initial}$, C and $K_r^{(x)}$ can be acquired from the initial PDCCH for the same TB. When $M_{sc}^{PUSCH-initial}$, C and $K_r^{(x)}$ are not included in the initial PDCCH (DCI format 0), the UE can determine these values using other methods.

For example, $M_{sc}^{PUSCH\text{-}initial}$, C and $K_r^{(x)}$; can be determined from the latest semi-persistently scheduled PDCCH when the initial PUSCH for the same TB is semi-persistently scheduled. Otherwise, when the PUSCH is initiated according to a random access response grant, $M_{sc}^{PUSCH\text{-}initial}$, C and $K_r^{(x)}$ can be determined from a random access response grant for the same TB.

Data information (G) bits of UL-SCH can be calculated by Equation 4.

$$G = N_{symb}^{PUSCH} \cdot M_{sc}^{PUSCH} \cdot Q_m - Q_{CQI} - Q_{RI} \quad \text{[Equation 4]}$$

When the number of REs for the CQI has been obtained as described above, the number of bits can be calculated in consideration of a modulation scheme after channel coding of the CQI. $Q_{CQI}$ is the total number of coded bits of the CQI and $Q_{CQI} = Q_m \cdot Q'$. Here, $Q_m$ is the number of bits per symbol according to modulation order and corresponds to 2 in the case of QPSK, 4 in the case of 16QAM, and 6 in the case of 64QAM. If RI is not transmitted, $R_{RI} = 0$.

3.4 Calculation of the Number of Coded Modulation Symbols for HARQ-ACK Bits or RI–2

$$Q' = \max[\min(Q'_{temp}, 4 \cdot M_{sc}^{PUSCH}), Q'_{min}] \quad \text{[Equation 6]}$$

$$Q'_{temp} = \left\lceil \frac{O \cdot M_{sc}^{PUSCH\text{-}initial(1)} \cdot N_{symb}^{PUSCH\text{-}initial(1)} \cdot M_{sc}^{PUSCH\text{-}initial(2)} \cdot N_{symb}^{PUSCH\text{-}initial(2)} \cdot \beta_{offset}^{PUSCH}}{\sum_{r=0}^{C(1)-1} K_r^{(1)} \cdot M_{sc}^{PUSCH\text{-}initial(2)} \cdot N_{symb}^{PUSCH\text{-}initial(2)} + \sum_{r=0}^{C(2)-1} K_r^{(2)} \cdot M_{sc}^{PUSCH\text{-}initial(1)} \cdot N_{symb}^{PUSCH\text{-}initial(1)}} \right\rceil \quad \text{[Equation 7]}$$

A description will be given of methods for calculating the number of REs used for ACK/NACK and RI, which are different from the methods described in paragraph 3.1.

When a UE transmits HARQ-ACK bits or RI bits in a single cell, the UE needs to determine the number of coded modulation symbols per layer for the HARQ-ACK or RI, Q'. The following Equation 5 is used to calculate the number of modulation symbols when only one TB is transmitted in an UL cell.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH} \right) \quad \text{[Equation 5]}$$

In Equation 5, the number of REs for the ACK/NACK (or RI) can be represented as the number of coded modulation symbols, Q'. Here, O denotes the number of bits of the ACK/NACK (or RI).

$\beta_{offset}^{HARQ\text{-}ACK}$ and $\beta_{offset}^{RI}$ are determined by the number of transmission codewords according to TB. Parameters for setting an offset value for considering an SNR difference between data and UCI are determined as $\beta_{offset}^{PUSCH} = \beta_{offset}^{HARQ\text{-}ACK}$ and $\beta_{offset}^{PUSCH} = \beta_{offset}^{RI}$.

$M_{sc}^{PUSCH}$ represents a bandwidth, which is allocated (scheduled) for PUSCH transmission in the current subframe for a TB, as the number of subcarriers. $N_{symb}^{PUSCH\text{-}initial}$ denotes the number of SC-FDMA symbols per initial PUSCH transport subframe for the same TB and $M_{sc}^{PUSCH\text{-}initial}$ represents the number of subcarriers per subframe for initial PUSCH transmission. $N_{symb}^{PUSCH\text{-}initial}$ can be calculated by Equation 2.

The number of subcarriers of the TB for initial transmission, $M_{sc}^{PUSCH\text{-}initial}$, the total number of code blocks derived from the TB, C, and the size of each code block, $K_r^{(x)}$ (x={0, 1}), can be obtained from the initial PDCCH for the same TB.

When the initial PDCCH (DCI format 0 or 4) does not include the above values, these values can be determined by other methods. For example, $N_{sc}^{PUSCH\text{-}initial}$, C and $K_r^{(x)}$ (x={0,1}) can be determined from the latest semi-persistently scheduled PDCCH when the initial PUSCH for the same TB is semi-persistently scheduled. Otherwise, when the PUSCH is initiated according to a random access response grant, the values can be determined from a random access response grant for the same TB.

When the UE transmits two TBs in the UL cell, the UE needs to determine the number of coded modulation symbols per layer for the HARQ-ACK or RI, Q'. The following Equations 6 and 7 are used to calculate the number of modulation symbols when two TBs have different initial transmission resource values in the UL cell.

In Equations 6 and 7, the number of REs for the ACK/NACK (or RI) can be represented by the number of coded modulation symbols, Q'. Here, O denotes the number of bits of the ACK/NACK (or RI). $Q'_{min} = O$ if $O \leq 2$ and $Q'_{min} = \lceil 2O/Q'_m \rceil$ and $Q'_m = \min(Q_m^1, Q_m^2)$ otherwise. $Q_m^x$ (x={1,2}) represents the modulation order of TB 'x' and $M_{sc}^{PUSCH\text{-}initial}$ (x={1,2}) denotes a scheduled bandwidth represented as the number of subcarriers for PUSCH transmission in the initial subframe for first and second TBs.

$N_{symb}^{PUSCH\text{-}initial(x)}$ (x={1,2}) indicates the number of SC-FDMA symbols per subframe for initial PUSCH transmission for the first and second TBs and can be calculated by Equation 8.

$$N_{symb}^{PUSCH\text{-}initial(x)} = (2 \cdot (N_{sym}^{UL} - 1) - N_{SRS}^{(x)}), x = \{1,2\} \quad \text{[Equation 8]}$$

In Equation 8, $N_{SRS}^{(x)}$ (x={1,2}) is 1 when the UE transmits the PUSCH and SRS in the same subframe for initial transmission of the TB 'x' or when PUSCH resource allocation for initial transmission of the TB 'x' partially overlaps with the subframe and bandwidth of a cell-specific SRS and $N_{SRS}^{(x)}$ (x={1,2}) is 0 otherwise.

In the embodiments of the present invention, the UE can acquire $M_{sc}^{PUSCH\text{-}initial(x)}$ (x={1,2}), C and $K_r^{(x)}$ (x={1,2}) from the initial PDCCH for the corresponding TB. When these values are not included in the initial PDCCH (DCI format 0 or 4), the UE can determine these values using other methods. For example, $M_{sc}^{PUSCH\text{-}initial(x)}$ (x={1,2}), C and $K_r^{(x)}$ (x={1,2}) can be determined from the latest semi-persistently scheduled PDCCH when the initial PUSCH for the same TB is semi-persistently scheduled. Otherwise, when the PUSCH is initiated according to a random access response grant, $M_{sc}^{PUSCH\text{-}initial(x)}$ (x={1,2}), C and $K_r^{(x)}$ (x={1,2}) can be determined from a random access response grant for the same TB.

In Equations 6 and 7, $\beta_{offset}^{HARQ\text{-}ACK}$ and $\beta_{offset}^{RI}$ are determined by the number of transmission codewords according to TB. Parameters for setting an offset value for considering an SNR difference between data and UCI are determined as $\beta_{offset}^{PUSCH}=\beta_{offset}^{HARQ-ACK}$ and $\beta_{offset}^{PUSCH}=\beta_{offset}^{RI}$.

3.5 Calculation of the Number of Coded Modulation Symbols for CQI and/or PMI-2

When a UE transmits CQI and/or PMI (CQI/PMI) bits over a PUSCH, the UE needs to calculate the number of REs for the CQI/PMI per layer. While the following description will mainly focus on CQI, the present invention can be applied to PMI in the same manner.

Figure 19:
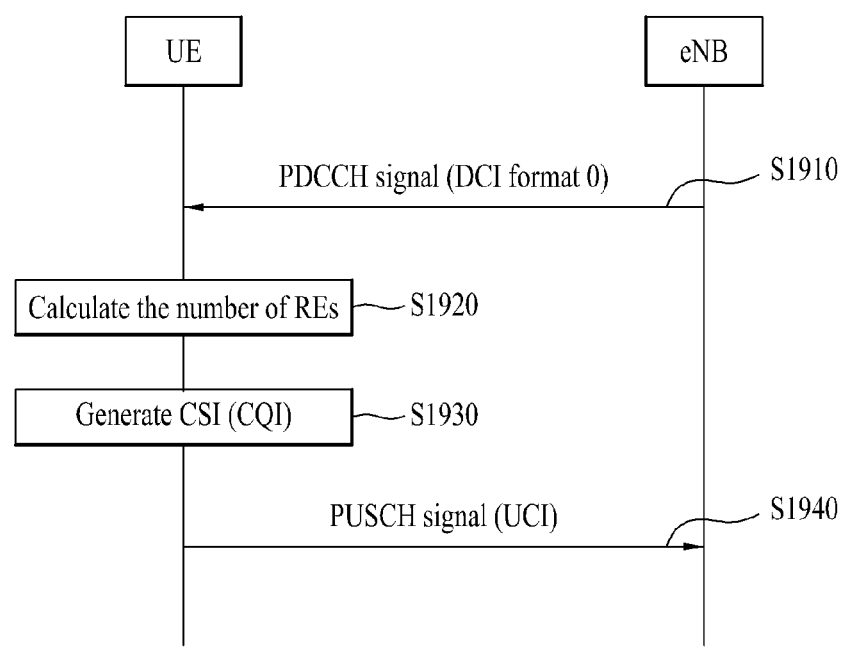
FIG. 19 illustrates a method for transmitting UCI according to an embodiment of the present invention.

FIG. 19 illustrates a method for transmitting UCI according to an embodiment of the present invention.

Referring to FIG. 19, an eNB can transmit an initial PDCCH signal including DCI format 0 or DCI format 4 to a UE (S1910).

The initial PDCCH signal may include information about the number of subcarriers, $M_{sc}^{PUSCH-initial(x)}$, information about the number of code blocks, $C^{(x)}$, and information about a code block size, $K_r^{(x)}$ for one of two transport blocks.

If $M_{sc}^{PUSCH-initial(x)}$, $C^{(x)}$, and $K_r^{(x)}$ are not included in the initial PDCCH signal (DCI format 0/4) in step S1910, the UE can determine the values using another method.

For example, $M_{sc}^{PUSCH-initial(x)}$, $C^{(x)}$ and $K_r^{(x)}$ can be determined from the latest semi-persistently scheduled PDCCH when the initial PUSCH for the same TB is semi-persistently scheduled. Otherwise, when the PUSCH is initiated according to a random access response grant, $M_{sc}^{PUSCH-initial(x)}$, $C^{(x)}$ and $K_r^{(x)}$ can be determined from a random access response grant for the same TB.

Referring back to FIG. 19, the UE can calculate REs for transmitting UCI using the information received in step S1910. Particularly, the UE can calculate the number of REs required to transmit CQI/PMI from among the UCI (S1920).

In the embodiments of the present invention, CQI/PMI is spread or multiplexed in all layers belonging to a TB having a maximum MCS and transmitted. If two TBs have the same MCS levels, CQI is transmitted in the first of the two TBs.

However, since the two TBs may have different initial RB sizes due to retransmission, the number of REs, Q', for the CQI transmitted through the PUSCH in step S1920 can be calculated by Equation 9.

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right.$$
$$\left. M_{sc}^{PUSCH} \cdot N_{symb}^{PUSCH} - \frac{Q_{RI}^{(x)}}{Q_m^{(x)}} \right)$$
[Equation 9]

Equation 9 is similar to Equation 3. However, Equation 3 cannot be used if TBs transmitting retransmission packets have different initial RB sizes when UL data and/or UCI are retransmitted. That is, Equation 9 can be applied when a PUSCH is transmitted using one or more TBs in a multi-carrier aggregation environment.

In Equation 9, O represents the number of bits of the CQI and L represents the number of bits of a CRC attached to the CQI bits. Here, L is 0 when O is 11 bits or less and is 8 otherwise. That is, $$L = \begin{cases} 0 & O \leq 11 \\ 8 & \text{otherwise.} \end{cases}$$

Here, $\beta_{offset}^{CQI}$ is determined by the number of transport codewords according to TBs and a parameter for determining an offset value for considering an SNR difference between data and UCI is determined as $\beta_{offset}^{PUSCH}=\beta_{offset}^{CQI}$.

$M_{sc}^{PUSCH-initial(x)}$ represents the number of subcarriers for the corresponding subframe, $C^{(x)}$ represents the total number of code blocks generated from each of the TBs, and $K_r^{(x)}$ denotes the size of the code block according to index r. As to $K_r^{(x)}$, x represents the transport block (TB) index corresponding to the highest MCS value ($I_{MCS}$), designated by an initial uplink grant.

At this time, the UE can obtain information about $M_{sc}^{PUSCH-initial(x)}$, $C^{(x)}$, and $K_r^{(x)}$ from the initial PDCCH in step S1910.

$N_{symb}^{PUSCH-initial(x)}$ represents the number of SC-FDMA symbols per initial PUSCH transmission subframe for the same TB. Here, $N_{symb}^{PUSCH-initial(x)}$ is the number of SC-FDMA symbols per subframe for initial PUSCH transmission for first and second TBs.

In addition, the UE can calculate $N_{symb}^{PUSCH-initial(x)}$ using Equation 10.

$$N_{symb}^{PUSCH-initial(x)}=(2\cdot(N_{symb}^{UL}-1)-N_{SRS}^{(x)}, x=\{1,2\}$$ [Equation 10]

In Equation 10, $N_{SRS}^{(x)}$ can be set to 1 when the UE transmits the PUSCH and SRS in the same subframe for initial transmission of TB 'x' or when PUSCH resource allocation for initial transmission of the TB 'x' partially overlaps with the subframe and frequency bandwidth of a cell-specific SRS and to 0 otherwise.

Referring back to Equation 9, $M_{sc}^{PUSCH}$ represents a scheduled bandwidth for PUSCH transmission in the current subframe for the TB, as the number of subcarriers. $N_{symb}^{PUSCH}$ denotes the number of SC-FDMA symbols in the current subframe that transmits the PUSCH.

In Equation 9, 'x' denotes a TB corresponding to a maximum MCS level ($I_{MCS}$) designated by initial UL grant. If two TBs have the same MCS level in the initial UL grant, x can be set to 1 which indicates the first of the TBs.

Referring back to FIG. 19, the UE can generate UCI (CSI) including CQI using the number of REs, calculated in step S1920. Here, UCI other than the CQI can be calculated using Equations 1 and 2 and 5 to 8 (S1930).

The UE can calculate information (G) of uplink data (UL-SCH) transmitted through the PUSCH. That is, the UE can calculate information about uplink data which will be transmitted together with the UCI computed in step S1930. Then, the UE can transmit a PUSCH including the UCI and UL data to the eNB (S1940).

In step S1940, bits of UL-SCH data information (G) can be calculated by Equation 11.

$$G=N_L^{(x)} \cdot (N_{symb}^{PUSCH} \cdot M_{sc}^{PUSCH} \cdot Q_m^{(x)} - Q_{CQI} - Q_{RI}^{(x)})$$ [Equation 11]

When the UE has calculated the number of REs for the CQI (refer to equation 9), the UE can obtain the number of bits in consideration of a modulation scheme for the CQI after CQI channel coding. In Equation 11, $N_L^{(x)}$ represents the number of layers corresponding to an x-th UL-SCH TB and $Q_{CQI}$ represents the total number of coded bits of the CQI. $Q_{CQI}=Q_m^{(x)} \cdot Q'$. Here, $Q_m^{(x)}$ is the number of bits per symbol according to the modulation order in each TB and corresponds to 2 in the case of QPSK, 4 in the case of 16QAM, and 6 in the case of 64QAM. Since uplink resources for RI are preferentially allocated, the number or REs allocated to the RI is excluded from the uplink data information (G) bits. If the RI is not transmitted, $Q_{RI}^{(x)}=0$.

In FIG. 19, the number of REs allocated to the CQI is obtained using parameters according to initial transmission of the TB (or CW) transmitting the CQI and a maximum value of the allocated REs is acquired by subtracting a value, obtained by dividing the number of bits of RI, $Q_{RI}^{(x)}$, defined in the TB (or CW) transmitting the CQI, by the modulation order $Q_m^{(x)}$ of the TB (or CW) transmitting the CQI, from the resources $M_{sc}^{PUSCH} \cdot N_{symb}^{PUSCH}$ of the current subframe (refer to Equation 9).

Figure 20:
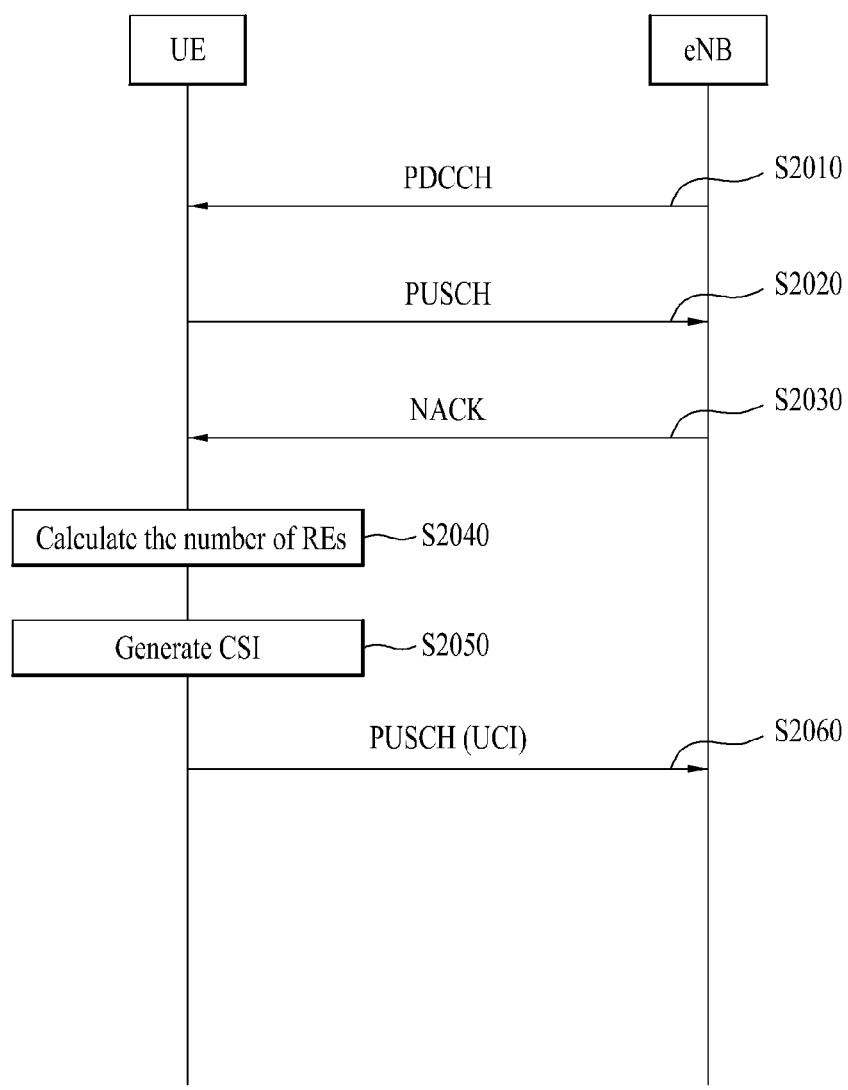
FIG. 20 illustrates a method for transmitting UCI according to another embodiment of the present invention.

FIG. 20 illustrates a method for transmitting UCI according to another embodiment of the present invention.

Referring to FIG. 20, an eNB transmits a PDCCH signal to a UE in order to allocate downlink and uplink resources (S2010).

The UE transmits uplink data and/or UCI to the eNB over a PUSCH in response to control information included in the PDCCH signal (S2020).

When an error is generated in the PUSCH transmitted from the UE to the eNB in step S2020, the eNB transmits a NACK signal to the UE (S2030).

When the UE retransmits the uplink data upon reception of the NACK signal, the UE can compute resources for transmitting the uplink data and UCI from among radio resources allocated thereto. Accordingly, the UE can calculate the number of REs required to transmit the UCI (S2040).

In step S2040, CQI is spread in all layers belonging to a TB having a high MCS level to be transmitted. Here, two TBs have the same MCS level, the CQI is preferably transmitted in the first TB. However, since the PUSCH signal needs to be transmitted in step S2040, the TBs may have different initial RB sizes. Accordingly, the UE preferably calculates the number of REs required to transmit the CQI through the method according to Equation 9.

When $M_{sc}^{PUSCH\text{-}initial(x)}$, $C^{(x)}$ and $K_r^{(x)}$ are included in the PDCCH signal in step S2010, the UE can calculate the number of REs for transmitting the CQI using corresponding information in step S2040. If the UE receives a PDCCH including $M_{sc}^{PUSCH\text{-}initial(x)}$, $C^{(x)}$ and $K_r^{(x)}$ after step S2030, the UE can calculate the number of the REs for transmitting the CQI using the values.

Referring back to FIG. 20, the UE can generate UCI using the number of the REs for transmitting the CQI, obtained in step S2040. Here, the UE can compute the numbers of REs for transmitting HARQ-ACK and/or RI using the methods according to Equations 6 and 7 and generate the UCI using the number of the REs (S2050).

In addition, the UE can calculate UL-SCH data information G for uplink data to be retransmitted using Equation 10. Accordingly, the UE can multiplex (or piggyback) the UCI with (or on) the uplink data to retransmit the uplink data to the eNB (S2060).

3.6 Channel Coding

A description will be given of a method for channel-coding the UCI on the basis of the number of REs for the UCI, calculated using the above-described methods.

When the information bit of ACK/NACK is 1 bit, an input sequence can be represented as $[o_0^{ACK}]$ and channel coding can be performed according to modulation orders as shown in Table 1. $Q_m$ is the number of bits per symbols according to modulation order and corresponds to 2, 4 and 6 when QPSK, 16QAM and 64QAM are used, respectively.

TABLE 1

| $Q_m$ | Encoded HARQ-ACK |
|---|---|
| 2 | $[o_0^{ACK} \, y]$ |
| 4 | $[o_0^{ACK} \, y \, x \, x]$ |
| 6 | $[o_0^{ACK} \, y \, x \, x \, x \, x]$ |

When the information bit of ACK/NACK is 2 bits, an input sequence can be represented as $[o_0^{ACK} \, o_1^{ACK}]$ and channel coding can be performed according to modulation orders as shown in Table 2. Here, $o_0^{ACK}$ is an ACK/NACK bit for codeword 0, $o_1^{ACK}$ is an ACK/NACK bit for codeword 1, and $o_2^{ACK} = (o_0^{ACK} + o_1^{ACK}) \bmod 2$. In Tables 1 and 2, x and y denote place-holders for scrambling the ACK/NACK information in order to maximize the Euclidean distance of modulation symbols that transmit the ACK/NACK information.

TABLE 2

| $Q_m$ | Encoded HARQ-ACK |
|---|---|
| 2 | $[o_0^{ACK} \, o_1^{ACK} \, o_2^{ACK} \, o_0^{ACK} \, o_1^{ACK} \, o_2^{ACK}]$ |
| 4 | $[o_0^{ACK} \, o_1^{ACK} \, x \, x \, o_2^{ACK} \, o_0^{ACK} \, x \, x \, o_1^{ACK} \, o_2^{ACK} \, x \, x]$ |
| 6 | $[o_0^{ACK} \, o_1^{ACK} \, x \, x \, x \, x \, o_2^{ACK} \, o_0^{ACK} \, x \, x \, x \, x \, o_1^{ACK} \, o_2^{ACK} \, x \, x \, x \, x]$ |

In ACK/NACK multiplexing in FDD or TDD, if the ACK/NACK is 1 bit or 2 bits, a bit sequence $q_0^{ACK}$, $q_1^{ACK}$, $q_2^{ACK}$, ..., $q_{Q_{ACK}-1}^{ACK}$ is generated according to concatenation of multiple coded ACK/NACK blocks. In the case of ACK/NACK bundling in TDD, a bit sequence $\tilde{q}_0^{ACK}$, $\tilde{q}_1^{ACK}$, $\tilde{q}_2^{ACK}$, ..., $\tilde{q}_{Q_{ACK}-1}^{ACK}$ is also generated according to concatenation of the multiple coded ACK/NACK blocks. Here, $Q_{ACK}$ is the total number of coded bits of all coded ACK/NACK blocks. Final concatenation of coded ACK/NACK blocks may be partially made such that the total bit sequence length corresponds to $Q_{ACK}$.

A scrambling sequence $[w_0^{ACK} \, w_1^{ACK} \, w_2^{ACK} \, w_3^{ACK}]$ can be selected from Table 3 and index i used to select the scrambling sequence can be calculated by Equation 12.

$$i = (N_{bundled} - 1) \bmod 4 \qquad \text{[Equation 12]}$$

TABLE 3

| i | $[w_0^{ACK} \, w_1^{ACK} \, w_2^{ACK} \, w_3^{ACK}]$ |
|---|---|
| 0 | [1 1 1 1] |
| 1 | [1 0 1 0] |
| 2 | [1 1 0 0] |
| 3 | [1 0 0 1] |

Table 3 is a scrambling sequence selection table for TDD ACK/NACK bundling.

The bit sequence $q_0^{ACK}$, $q_1^{ACK}$, $q_2^{ACK}$, ..., $q_{Q_{ACK}-1}^{ACK}$ is generated by setting m to 1 in the case of 1-bit ACK/NACK and by setting m to 3 in the case of 2-bit ACK/NACK. Here, an algorithm of generating the bit sequence $q_0^{ACK}$, $q_1^{ACK}$, $q_2^{ACK}$, ..., $q_{Q_{ACK}-1}^{ACK}$ is illustrated in Table 4.

TABLE 4

```
Set I ,k to 0
while i < Q_ACK
    if q̃_i^ACK = y   // place-holder repetition bit
    q_i^ACK = (q̃_{i-1}^ACK + w_{⌊k/m⌋}^ACK) mod 2
    k = (k + 1) mod 4m
    else
        if q̃_i^ACK = x   // a place-holder bit
        q_i^ACK = q̃_i^ACK
```

TABLE 4-continued

```
        else // coded bit
        q_i^ACK = (q̃_i^ACK + w_{⌊k/m⌋}^ACK)mod2
        k = (k + 1)mod 4m
      end if
      i = i + 1
    end while
```

When the ACK/NACK is 2 bits or more (i.e. $[o_0^{ACK}\ o_1^{ACK} \ldots o_{O^{ACK}-1}^{ACK}]$ and $O^{ACK}>2$), the bit sequence $q_0^{ACK}$, $q_1^{ACK}, q_2^{ACK}, \ldots, q_{Q_{ACK}-1}^{ACK}$ can be computed by Equation 13.

$$q_i^{ACK} = \sum_{n=0}^{O^{ACK}-1} (o_n^{ACK} \cdot M_{(i\,mod\,32),n})mod2 \quad \text{[Equation 13]}$$

In Equation 13, i=0, 1, 2, . . . , $Q_{ACK}$−1 and a basic sequence $M_{i,n}$ can refer to Table 5.2.2.6.4-1 of 3GPP TS36.212 standard document. A vector sequence output of channel coding performed on the HARQ-ACK information can be defined as $\underline{q}_0^{ACK}, \underline{q}_1^{ACK}, \ldots, \underline{q}_{Q'_{ACK}-1}^{ACK}$. Here, $Q'_{ACK}=Q_{ACK}/Q_m$.

An algorithm of generating the bit sequence $\underline{q}_0^{ACK}$, $\underline{q}_1^{ACK}, \ldots, \underline{q}_{Q'_{ACK}-1}^{ACK}$ is illustrated in Table 5.

TABLE 5

```
Set i,k to 0
while i < Q_ACK
  q_k^ACK = [q_i^ACK ... q_{i+Q_m-1}^ACK]^T
  i = i + Q_m
  k = k + 1
end while
```

When the RI is 1 bit, an input sequence can be represented as $[o_0^{RI}]$ and channel coding can be performed according to modulation orders as shown in Table 6.

TABLE 6

| $Q_m$ | Encoded RI |
|---|---|
| 2 | $[o_0^{RI}\ y]$ |
| 4 | $[o_0^{RI}\ y\ x\ x]$ |
| 6 | $[o_0^{RI}\ y\ x\ x\ x\ x]$ |

$Q_m$ is the number of bits according to modulation order and corresponds to 2, 4 and 6 when QPSK, 16QAM and 64QAM are used, respectively. A mapping relationship between $[o_0^{RI}]$ and RI is illustrated in Table 7.

TABLE 7

| $o_0^{RI}$ | RI |
|---|---|
| 0 | 1 |
| 1 | 2 |

When the RI is 2 bits, an input sequence can be represented as $[o_0^{RI}\ o_1^{RI}]$ and channel coding can be performed according to modulation orders as shown in Table 8. Here, $o_0^{RI}$ is the most significant bit (MSB) of the 2-bit input, $o_1^{RI}$ the least significant bit (LSB) of the 2-bit input, and $o_2^{RI}=(o_0^{RI}+o_1^{RI})$ mod 2.

TABLE 8

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

Table 9 shows an exemplary mapping relationship between $[o_0^{RI}]$ and RI.

TABLE 9

| $o_0^{RI}$ | RI |
|---|---|
| 0 | 1 |
| 1 | 2 |

In Tables 6 and 8, x and y denote place-holders for scrambling the RI in order to maximize the Euclidean distance of modulation symbols that transmit the RI.

A bit sequence $q_0^{RI}, q_1^{RI}, q_2^{RI}, \ldots, q_{Q_{RI}-1}^{RI}$ is generated according to concatenation of multiple coded RI blocks. Here, $Q_{RI}$ is the total number of coded bits of all coded RI blocks. Last concatenation of coded RI blocks can be partially made such that the total bit sequence length corresponds to $Q_{RI}$.

A vector output sequence of channel coding performed on the RI is defined as $\underline{q}_0^{RI}, \underline{q}_1^{RI}, \ldots, \underline{q}_{Q'_{RI}-1}^{RI}$. Here, $Q'_{RI}=Q_{RI}/Q_m$ and the vector output sequence can be acquired according to an algorithm illustrated in Table 10.

TABLE 10

```
Set i,k to 0
while i < Q_RI
  q_k^RI = [q_i^RI ... q_{i+Q_m-1}^RI]^T
  i = i + Q_m
  k = k + 1
end while
```

If the RI (or ACK/NACK) is 3 to 11 bits, RM coding is applied thereto to generate a 32-bit output sequence. RM-coded RI (or ACK/NACK) blocks $b_0, b_1, b_2, b_3, \ldots, n_{B-1}$ are calculated by Equation 14. In Equation 14, i=0, 1, 2, . . . , B−1 and B=32.

$$b_i = \sum_{n=0}^{I-1} (o_n \cdot M_{i,n})mod2 \quad \text{[Equation 14]}$$

In Equation 14, i=0, 1, 2, . . . , $Q_{RI}$−1 and a basic sequence $M_{i,n}$ can refer to Table 5.2.2.6.4-1 of 3GPP TS36.212 standard document.

4. Apparatuses for Implementing the Aforementioned Methods

Figure 21:
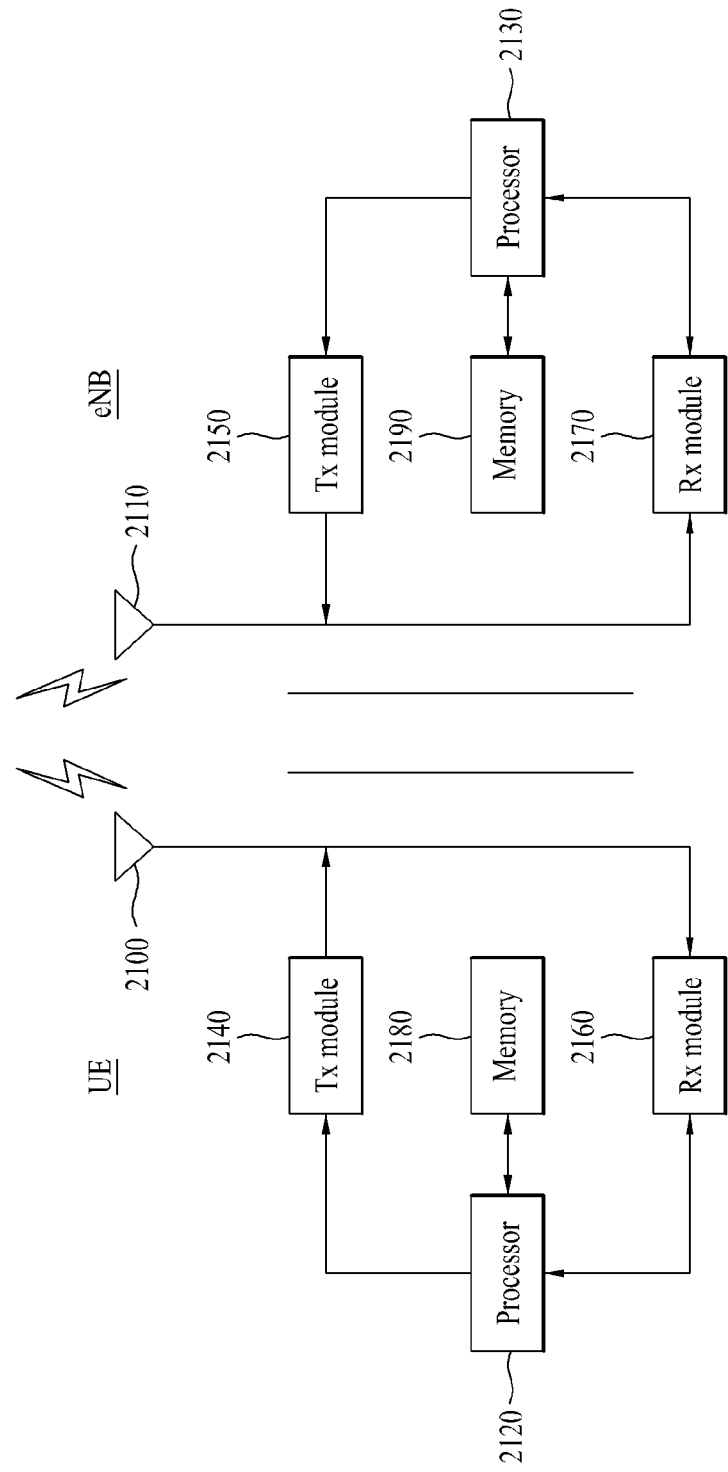
FIG. 21 shows apparatuses for implementing the methods described in FIGS. 1 to 20.

FIG. 21 shows apparatuses for implementing the above-mentioned methods described with reference to FIGS. 1 to 20.

A UE can serve as a transmitter on uplink and as a receiver on downlink. An eNB can serve as a receiver on uplink and as a transmitter on downlink.

The UE and the eNB may include transmission modules (Tx modules) 2140 and 2150 and reception modules (Rx modules) 2160 and 2170 for controlling transmission and reception of data and/or messages and antennas 2100 and 2110 for transmitting and receiving information, data and/or messages, respectively.

In addition, the UE and the eNB may respectively include processors 2120 and 2130 for performing the above-described embodiments of the present invention and memories 2180 and 2190 for storing processing procedures of the processors temporarily or continuously.

The embodiments of the present invention can be performed using the aforementioned components and functions of the UE and the eNB. The apparatuses shown in FIG. 21 may further include the components shown in FIGS. 2, 3 and 4. The processors 2120 and 2130 preferably include the components shown in FIGS. 2, 3 and 4.

The processor 2120 of the UE can monitor a search space to receive a PDCCH signal. Particularly, an LTE-A UE can receive a PDCCH signal without blocking PDCCH signals transmitted to other LTE UEs by performing blind decoding on an extended CSS.

The processor 2120 of the UE can transmit UCI with a PUSCH signal to the eNB. Specifically, the processor 2120 of the UE can calculate the numbers of REs for transmitting HARQ-ACK, CQI and RI using the above-mentioned methods according to Equations 1 to 10, generate UCI using the calculated numbers of REs, piggyback the UCI on uplink data UL-SCH and transmit the uplink data with the UCI.

The transmission modules 2140 and 2150 and the reception modules 2160 and 2170 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for transmitting channel quality control information through a physical uplink shared channel (PUSCH) in a wireless access system that supports hybrid automatic retransmit request (HARQ), the method performed by a user equipment (UE) and comprising:

receiving a physical downlink control channel (PDCCH) signal including an initial uplink grant;

transmitting uplink data using two transport blocks based on the initial uplink grant;

receiving a negative acknowledgement (NACK) information for one of the two transport blocks; and transmitting a channel quality control information along with the one of the two transport blocks which is retransmitted according to the NACK information and a new transport block through the PUSCH to which the HARQ is applied, wherein a number of coded symbols, Q', required to transmit the channel quality control information is calculated based on the initial uplink grant, wherein the initial uplink grant includes information $M_{sc}^{PUSCH\text{-}initial(x)}$ on the number of subcarriers for a transport block for transmitting the channel quality control information, information $C^{(x)}$ on a number of code blocks related to the transport block for transmitting the channel quality control information, and information $K_r^{(x)}$ on the size of the code blocks, and wherein 'x' denotes an index of the transport block for transmitting the channel quality control information.

2. The method according to claim 1, wherein the number of coded symbols, Q', is calculated by $$\min\left(\left\lceil \frac{(O+L) \cdot M_{sc}^{PUSCH\text{-}initial(x)} \cdot N_{symb}^{PUSCH\text{-}initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right),$$

wherein $N_{symb}^{PUSCH\text{-}initial(x)}$ represents a number of single carrier-frequency division multiple access (SC-FDMA) symbols per initial PUSCH transmission.

3. The method according to claim 1, further comprising:

calculating information about uplink data retransmitted through the one of the two transport block, wherein the information about the uplink data is calculated by $G = N_L^{(x)} \cdot (N_{symb}^{PUSCH} \cdot M_{sc}^{PUSCH} \cdot Q_m^{(x)} - Q_{CQI} - Q_{RI}^{(x)})$.

4. A user equipment (UE) for transmitting channel quality control information through a physical uplink shared channel (PUSCH) in a wireless access system that supports hybrid automatic retransmit request (HARQ), the UE comprising:
  a receiver;
  a transmitter; and
  a processor configured to transmit the channel quality control information,
  wherein the processor is configured to:
  receive, via the receiver, a physical downlink control channel (PDCCH) signal including an initial uplink grant;
  transmit, via the transmitter, uplink data using two transport blocks based on the initial uplink grant;
  receive, via the receiver, a negative acknowledgement (NACK) information for one of the two transport blocks; and
  transmit, via the transmitter, a channel quality control information along with the one of the two transport blocks which is retransmitted according to the NACK information and a new transport block through the PUSCH to which the HARQ is applied,
  wherein a number of coded symbols, Q', required to transmit the channel quality control information is calculated based on the initial uplink grant,
  wherein the initial uplink grant includes information $M_{sc}^{PUSCH\text{-}initial(x)}$ on the number of subcarriers for a transport block for transmitting the channel quality control information, information $C^{(x)}$ on a number of code blocks related to the transport block for transmitting the channel quality control information, and information $K_r^{(x)}$ on the size of the code blocks, and
  wherein 'x' denotes an index of the transport block for transmitting the channel quality control infolination.

5. The user equipment according to claim 4, wherein the number of coded symbols, Q', is calculated by $$\min\left(\left\lceil\frac{(O+L)\cdot M_{sc}^{PUSCH\text{-}initial(x)}\cdot N_{symb}^{PUSCH\text{-}initial(x)}\cdot \beta_{offset}^{PUSCH}}{\sum_{r=0}^{C^{(x)}-1} K_r^{(x)}}\right\rceil, M_{sc}^{PUSCH}\cdot N_{symb}^{PUSCH} - \frac{Q_{RI}^{(x)}}{Q_m^{(x)}}\right),$$

wherein $N_{symb}^{PUSCH\text{-}initial(x)}$ represents a number of single carrier-frequency division multiple access (SC-FDMA) symbols per initial PUSCH transmission.

6. The user equipment according to claim 4, wherein the processor is further configured to calculate information about uplink data retransmitted through the one of the two transport block,
  wherein the information about the uplink data is calculated by $G=N_L^{(x)}\cdot(N_{symb}^{PUSCH}\cdot M_{sc}^{PUSCH}\cdot Q_m^{(x)}-Q_{CQI}-Q_{RI}^{(x)})$.

7. A method for receiving channel quality control information through a physical uplink shared channel (PUSCH) in a wireless access system that supports hybrid automatic retransmit request (HARQ), the method performed by a base station and comprising:
  transmitting a physical downlink control channel (PDCCH) signal including an initial uplink grant;
  receiving uplink data using two transport blocks based on the initial uplink grant;
  transmitting a negative acknowledgement (NACK) information for one of the two transport blocks; and
  receiving a channel quality control information transmitted along with the one of the two transport blocks which is retransmitted according to the NACK information and a new transport block through the PUSCH to which the HARQ is applied,
  wherein a number of coded symbols, Q', required to transmit the channel quality control information is calculated based on the initial uplink grant,
  wherein the initial uplink grant includes information $M_{sc}^{PUSCH\text{-}initial(x)}$ on the number of subcarriers for a transport block for transmitting the channel quality control information, information $C^{(x)}$ on a number of code blocks related to the transport block for transmitting the channel quality control information, and information $K_r^{(x)}$ on the size of the code blocks, and
  wherein 'x' denotes an index of the transport block for transmitting the channel quality control information.

8. The method according to claim 7, wherein the number of coded symbols, Q', is calculated by $$\min\left(\left\lceil\frac{(O+L)\cdot M_{sc}^{PUSCH\text{-}initial(x)}\cdot N_{symb}^{PUSCH\text{-}initial(x)}\cdot \beta_{offset}^{PUSCH}}{\sum_{r=0}^{C^{(x)}-1} K_r^{(x)}}\right\rceil, M_{sc}^{PUSCH}\cdot N_{symb}^{PUSCH} - \frac{Q_{RI}^{(x)}}{Q_m^{(x)}}\right),$$

wherein $N_{symb}^{PUSCH\text{-}initial(x)}$ represents a number of single carrier-frequency division multiple access (SC-FDMA) symbols per initial PUSCH transmission.

9. A base station for receiving channel quality control information through a physical uplink shared channel (PUSCH) in a wireless access system that supports hybrid automatic retransmit request (HARQ), the base station comprising:
  a receiver;
  a transmitter; and
  a processor configured to receive the channel quality control information,
  wherein the processor is configured to:
  transmit, via the transmitter, a physical downlink control channel (PDCCH) signal including an initial uplink grant;
  receive, via the receiver, uplink data using two transport blocks based on the initial uplink grant;
  transmit, via the transmitter, a negative acknowledgement (NACK) information for one of the two transport blocks; and
  receive, via the receiver, a channel quality control information transmitted along with the one of the two transport blocks which is retransmitted according to the NACK information and a new transport block through the PUSCH to which the HARQ is applied,
  wherein a number of coded symbols, Q', required to transmit the channel quality control information is calculated based on the initial uplink grant,
  wherein the initial uplink grant includes information $M_{sc}^{PUSCH\text{-}initial(x)}$ on the number of subcarriers for a transport block for transmitting the channel quality control information, information $C^{(x)}$ on a number of code blocks related to the transport block for transmitting the channel quality control information, and information $K_r^{(x)}$ on the size of the code blocks, and wherein 'x' denotes an index of the transport block for transmitting the channel quality control information.

10. The base station according to claim 9, wherein the number of coded symbols, Q', is calculated by $$\min\left(\left\lceil\frac{(O+L)\cdot M_{sc}^{PUSCH-initial(x)}\cdot N_{symb}^{PUSCH-initial(x)}\cdot \beta_{offset}^{PUSCH}}{\sum_{r=0}^{C^{(x)}-1} K_r^{(x)}}\right\rceil, M_{sc}^{PUSCH}\cdot N_{symb}^{PUSCH} - \frac{Q_{RI}^{(x)}}{Q_m^{(x)}}\right),$$

wherein $N_{symb}^{PUSCH-initial(x)}$ represents a number of single carrier-frequency division multiple access (SC-FDMA) symbols per initial PUSCH transmission.

* * * * *